(12) United States Patent
Doi et al.

(10) Patent No.: US 10,859,172 B2
(45) Date of Patent: Dec. 8, 2020

(54) SWITCHING VALVE

(71) Applicant: SMC CORPORATION, Chiyoda-ku (JP)

(72) Inventors: Yoshitada Doi, Koshigaya (JP); Takamitsu Suzuki, Joso (JP); Mario Heitmann, Langenfeld (DE)

(73) Assignee: SMC CORPORATION, Chiyoda-ku (JP)

( * ) Notice: Subject to any disclaimer, the term of this patent is extended or adjusted under 35 U.S.C. 154(b) by 179 days.

(21) Appl. No.: 15/776,823

(22) PCT Filed: Apr. 14, 2016

(86) PCT No.: PCT/JP2016/062017
§ 371 (c)(1),
(2) Date: May 17, 2018

(87) PCT Pub. No.: WO2017/085948
PCT Pub. Date: May 26, 2017

(65) Prior Publication Data
US 2018/0335152 A1 Nov. 22, 2018

(30) Foreign Application Priority Data
Nov. 20, 2015 (JP) ................. 2015-227806

(51) Int. Cl.
*F16K 11/074* (2006.01)
*F16K 11/14* (2006.01)
(Continued)

(52) U.S. Cl.
CPC .......... *F16K 11/0743* (2013.01); *F16K 11/04* (2013.01); *F16K 11/14* (2013.01);
(Continued)

(58) Field of Classification Search
CPC ............... F16K 11/0743; F16K 15/145; F16K 31/52416; F16K 11/04; F16K 31/041;
(Continued)

(56) References Cited

U.S. PATENT DOCUMENTS 3,116,757 A   1/1964   Donguy et al.
5,361,796 A * 11/1994   Mutter ................ F16K 11/0743
                                                                    137/14
(Continued)

FOREIGN PATENT DOCUMENTS

JP           47-15440 A        5/1972
JP       WO 93/10382 A1        5/1993
(Continued)

OTHER PUBLICATIONS

International Search Report dated Jul. 12, 2016 in PCT/JP2016/062017 filed Apr. 14, 2016.
(Continued)

*Primary Examiner* — Michael R Reid
(74) *Attorney, Agent, or Firm* — Oblon, McClelland, Maier & Neustadt, L.L.P.

(57) ABSTRACT

A switching valve is constructed such that a rotor is rotatably provided inside a body and a cover member is provided with respect to the body so as to face a table part of the rotor. A gap having a prescribed interval is provided between an upper surface of the table part and the cover member, and a valve body biased toward the cover member side is provided to the table part. When rotating, the rotor does not slide on the bottom surface of the cover member, and leakage of a liquid from an inlet port is prevented due to the valve body seated on and closing an outlet port that is not the outlet port which is provided to the cover member so as to cause the liquid to be outputted therethrough.

6 Claims, 19 Drawing Sheets

(51) Int. Cl.
  *F16K 31/04* (2006.01)
  *F16K 11/04* (2006.01)
  *F16K 31/524* (2006.01)
  *F16K 15/14* (2006.01)

(52) U.S. Cl.
  CPC ............ *F16K 15/145* (2013.01); *F16K 31/04* (2013.01); *F16K 31/041* (2013.01); *F16K 31/52416* (2013.01)

(58) Field of Classification Search
  CPC .......... F16K 11/14; F16K 11/18; F16K 11/20; F16K 11/074; F16K 3/314; F16K 3/08; Y10T 137/86533
  USPC ..................................................... 137/625.15
  See application file for complete search history.

(56) References Cited

U.S. PATENT DOCUMENTS

| | | | |
|---|---|---|---|
| 5,732,739 A | | 3/1998 | Ota |
| 6,352,105 B1 * | | 3/2002 | Serratto .................... F24F 3/08 137/597 |
| 2004/0103004 A1 | | 6/2004 | Beswick et al. |
| 2012/0204979 A1 | | 8/2012 | Pan |

FOREIGN PATENT DOCUMENTS

| | | |
|---|---|---|
| JP | 2001-4052 A | 1/2001 |
| JP | 2001-141093 A | 5/2001 |
| JP | 2001-519513 A | 10/2001 |
| JP | 2014-178239 A | 9/2014 |
| WO | 2014-114865 A | 6/2014 |

OTHER PUBLICATIONS

Office Action and Search Report dated Mar. 1, 2019 in the corresponding Russian Patent Application No. 2018122289 with English Translation citing document AA therein 22 pages.

Indian Examination Report dated Jan. 13, 2020, in Patent Application No. 201847021912, citing documents AA-AB therein, 6 pages.

Korean Office Action dated Oct. 10, 2019 in Korean Patent Application No. 10-2018-7017540 (with unedited computer generated English translation), citing document AO therein, 14 pages.

Japanese Office Action dated Oct. 23, 2019 in Japanese Patent Application No. 2017-551542 (with unedited computer generated English translation), citing document AA, AP AQ and AR therein, 14 pages.

\* cited by examiner

SWITCHING VALVE

TECHNICAL FIELD

The present invention relates to a switching valve that can switch the communicating state of a plurality of ports by rotating a rotating body by the driving action of a drive section.

BACKGROUND ART

Conventionally, a switching valve that can switch between a plurality of flow paths has been known. For example, as disclosed in Japanese Laid-Open Patent Publication No. 2001-141093 and Japanese Laid-Open Patent Publication No. 2014-114865, in such a switching valve, a valve body is rotatably provided in a valve case and an end thereof is in sliding contact with a disk-shaped valve seat. In this valve seat, a plurality of switching ports are formed, and, below the valve body, a communicating hole that makes two switching ports communicate with each other is formed. As a result of the valve body rotating by the driving action of a drive section, the communicating hole is located in a position in which the communicating hole faces the two switching ports, and fluid which is introduced from one switching port flows through the communicating hole into the other switching port.

SUMMARY OF INVENTION

However, in the above-described switching valve according to Japanese Laid-Open Patent Publication No. 2001-141093, since an end of the valve body and the valve seat are to be in sliding contact with each other, a lubricant such as grease is often applied therebetween. For example, when this switching valve is used to switch the supply state of liquid, the liquid flowing into the valve case is undesirably contaminated by contact with the lubricant.

Moreover, also in the switching valve according to Japanese Laid-Open Patent Publication No. 2014-114865, a configuration is adopted in which when the valve body performs a rotational operation, an end face thereof slides on a valve seat surface. Thus, both the end face of the valve body and the valve seat surface are required to have surface accuracy, for example, and machining or the like is performed to achieve the surface accuracy, which results in an increase in production costs, and if the temperature of the valve body increases with the contact and the valve body expands, contact resistance between the valve body and the valve seat surface increases and an unusual sound or wear occurs, which results in a reduction in durability. In addition thereto, a reduction in the sealing performance therebetween is caused and leakage of the fluid occurs.

A general object of the present invention is to provide a switching valve that can achieve enhancement of durability while ensuring sealing performance, and can prevent contamination of liquid while reducing production costs.

To attain the above-described object, the present invention is directed to a switching valve that includes a body including an introduction port into which liquid is introduced and a plurality of lead-out ports from which the liquid is led out, and a rotating body rotatably provided in the body, wherein as a result of the rotating body rotating by a driving action of a drive section, any one of the plurality of lead-out ports and the introduction port communicate with each other via a communicating path formed at an end of the rotating body, and a supply state of the liquid to the lead-out ports is switched, wherein the end of the rotating body is provided so as to face an inner wall surface of the body in which the introduction port and the lead-out ports are formed, a valve body is provided at the end, the valve body configured to close another lead-out port other than the lead-out port that leads the liquid out, and a space in an axial direction of the rotating body is provided between the end and the inner wall surface.

According to the present invention, the rotating body is rotatably provided in the body constituting the switching valve. At the end of the rotating body facing the inner wall surface of the body in which the introduction port and the lead-out ports are formed, the valve body is provided for closing the lead-out ports other than the lead-out port which leads the liquid out via the communicating path, and the space in the axial direction is provided between the end of the rotating body and the inner wall surface of the body.

Thus, when the liquid supplied to the introduction port is made to flow into a desired lead-out port of the plurality of lead-out ports through the communicating path by rotating the rotating body by the driving action of the drive section, by closing the other lead-out ports with the valve body, the liquid does not leak from the lead-out ports which are other than the desired lead-out port. Thus, it is possible to ensure sealing performance reliably. Moreover, when the rotating body rotates, since the end does not come into contact with the inner wall surface of the body, the rotating body and the body do not slide on each other, which eliminates the need for the application of a lubricant such as grease and a possibility of contamination of the liquid flowing into the space. Furthermore, since the occurrence of an unusual sound or wear caused by contact can be prevented, it is possible to achieve enhancement of durability. In addition, since the end of the rotating body and the inner wall surface of the body are not required to have surface accuracy, the need for machining or the like to ensure surface accuracy is eliminated, which makes it possible to achieve a reduction in production costs compared to a conventional switching valve.

The above-described objects, features, and advantages will be easily understood from the following description of embodiments given below with reference to the attached drawings.

DESCRIPTION OF EMBODIMENTS

Figure 1:
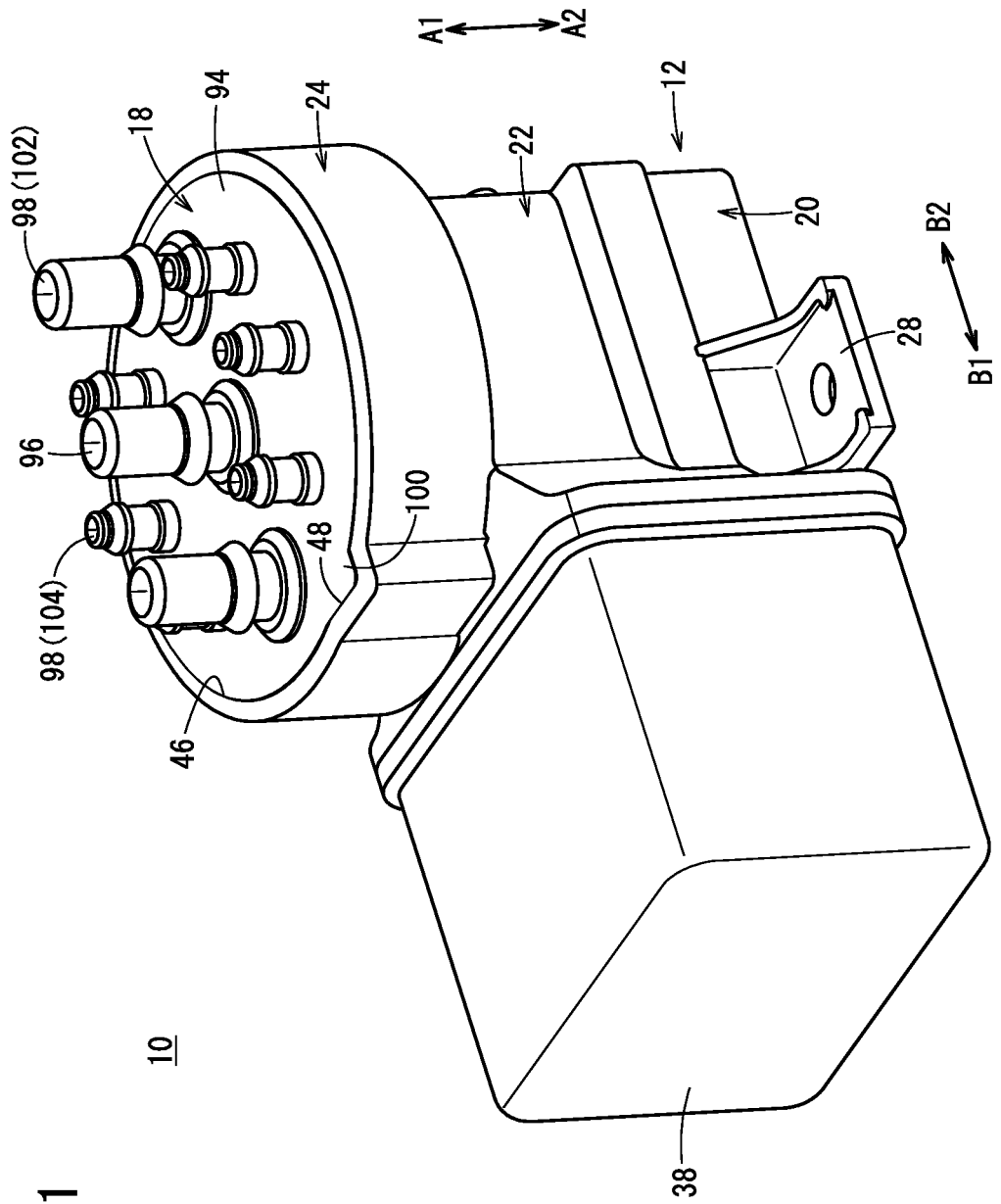
FIG. 1 is an external perspective view of a switching valve according to a first embodiment of the present invention.

A switching valve 10 according to a first embodiment includes, as depicted in FIGS. 1 to 6, a body 12, a drive section 14 that is provided on a side of the body 12, a rotor (a rotating body) 16 that is rotatably provided in the body 12, and a covering member (a body) 18 that faces the upper surface of the rotor 16 and closes an opening of the body 12.

The body 12 is formed of, for example, a material made of resin and configured with a base section 20, a main body section 22 formed on the upper part of the base section 20, and a hollow housing section 24 that is formed on the upper part of the main body section 22, the housing section 24 whose diameter is increased radially outward. The housing section 24 has an opening formed in a direction (an arrow A1 direction) in which the housing section 24 extends away from the base section 20.

Figure 4:
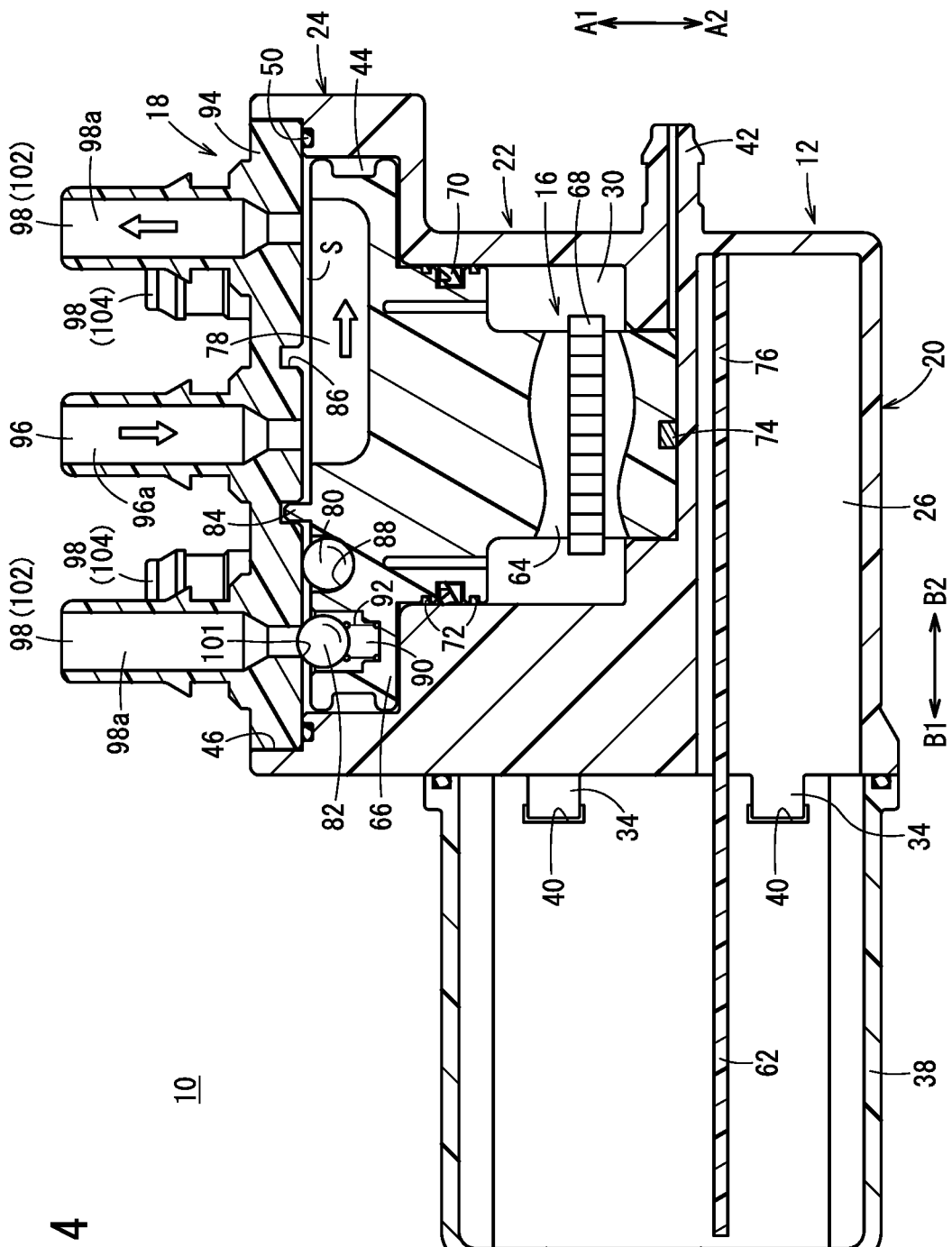
FIG. 4 is a sectional view taken along the line IV-IV of FIG. 3.

This base section 20 is formed so as to be rectangular in cross section, for example, and has a space section 26 formed therein and having an opening formed on one side thereof and extending to the inside of the base section 20 in a horizontal direction (directions of arrows B1, B2). In addition, in the space section 26, as depicted in FIGS. 2 and 4, part of the drive section 14 and a control circuit board 62, which will be described later, are housed.

Figure 2:
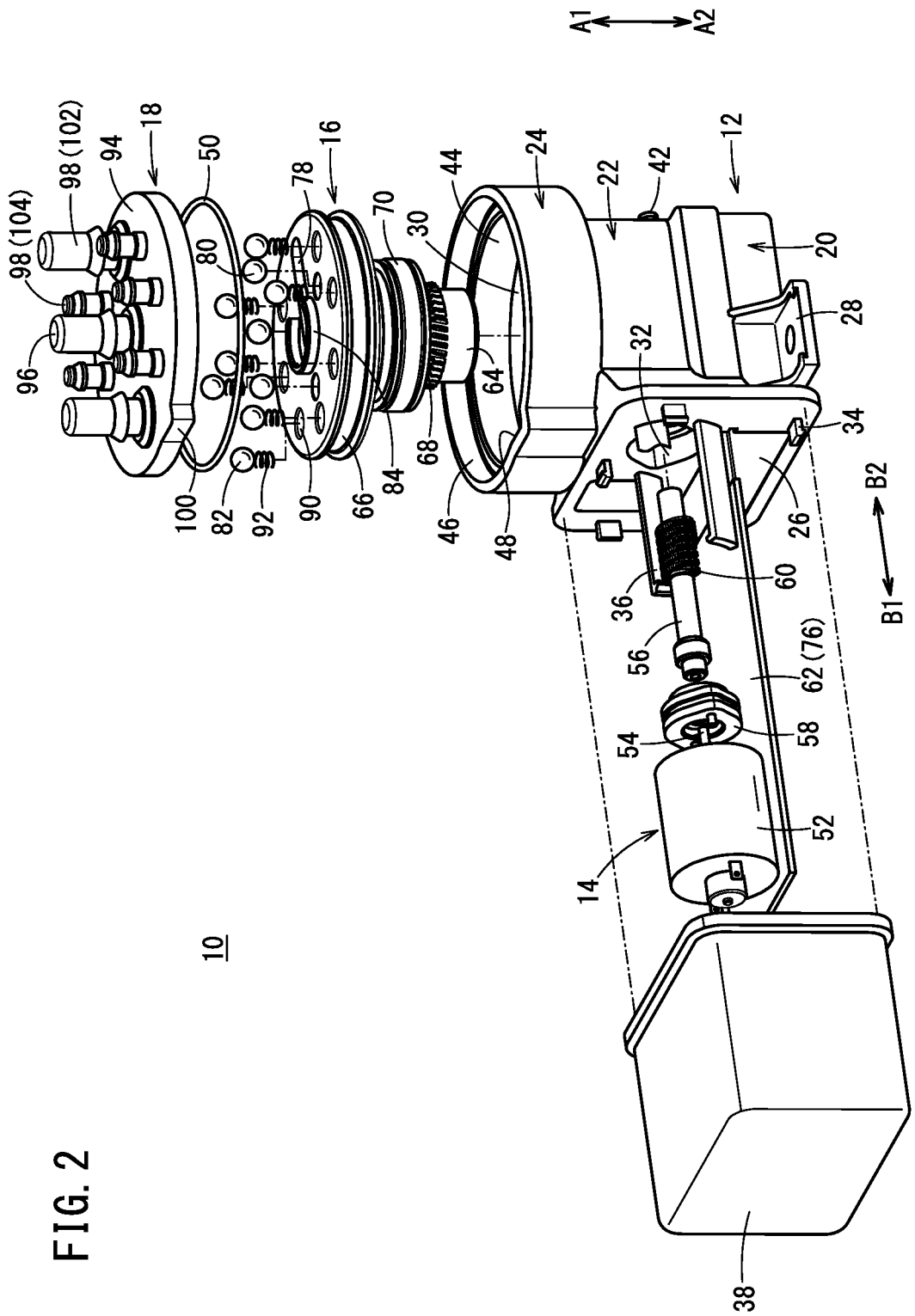
FIG. 2 is an exploded perspective view of the switching valve depicted in FIG. 1.
Figure 3:
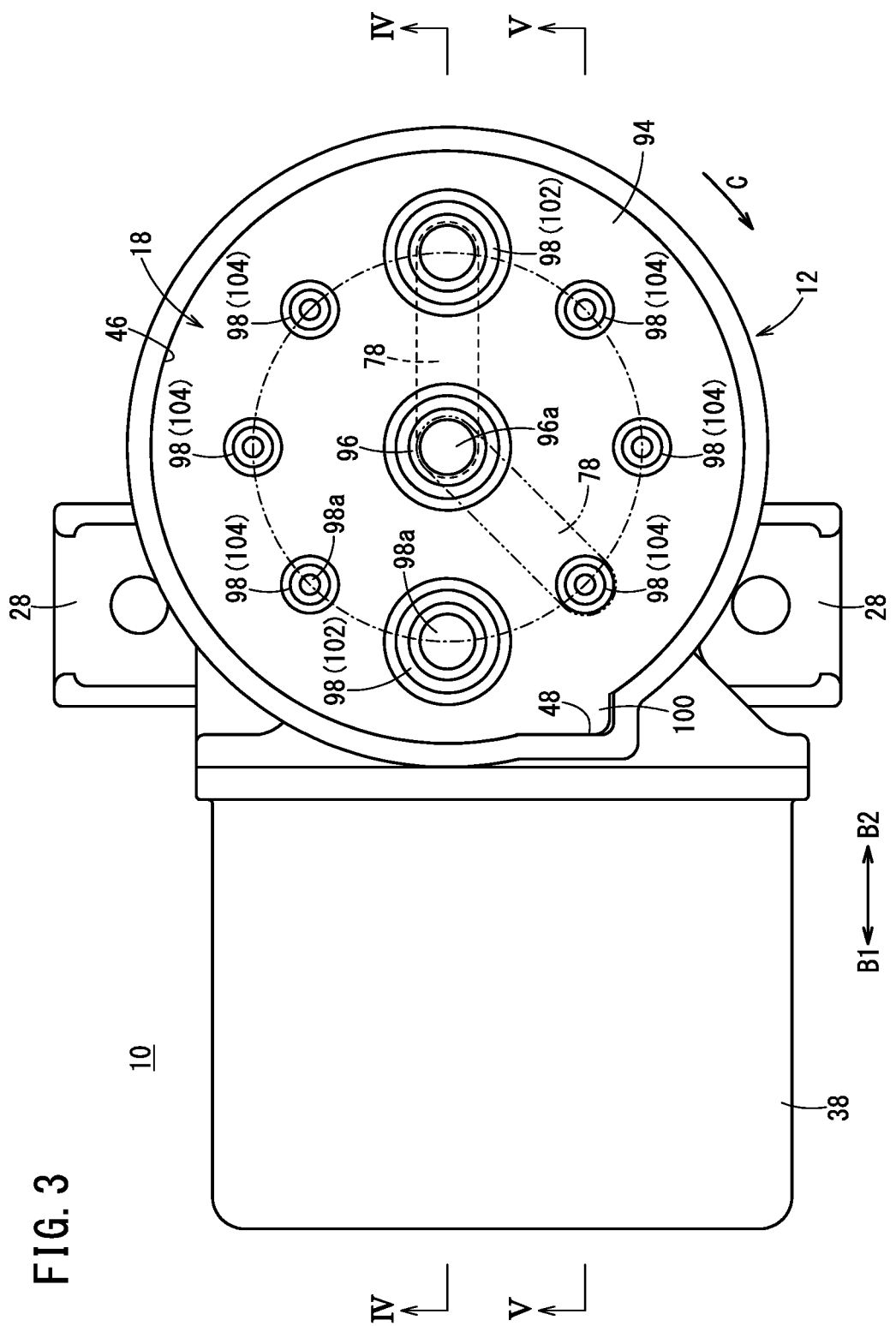
FIG. 3 is a plan view of the switching valve depicted in FIG. 1.

Meanwhile, as depicted in FIGS. 1 to 3, on the outside of the base section 20, an attachment section 28 for fixing the switching valve 10 is formed and fixed to another member or the like via an unillustrated bolt.

Figure 5:
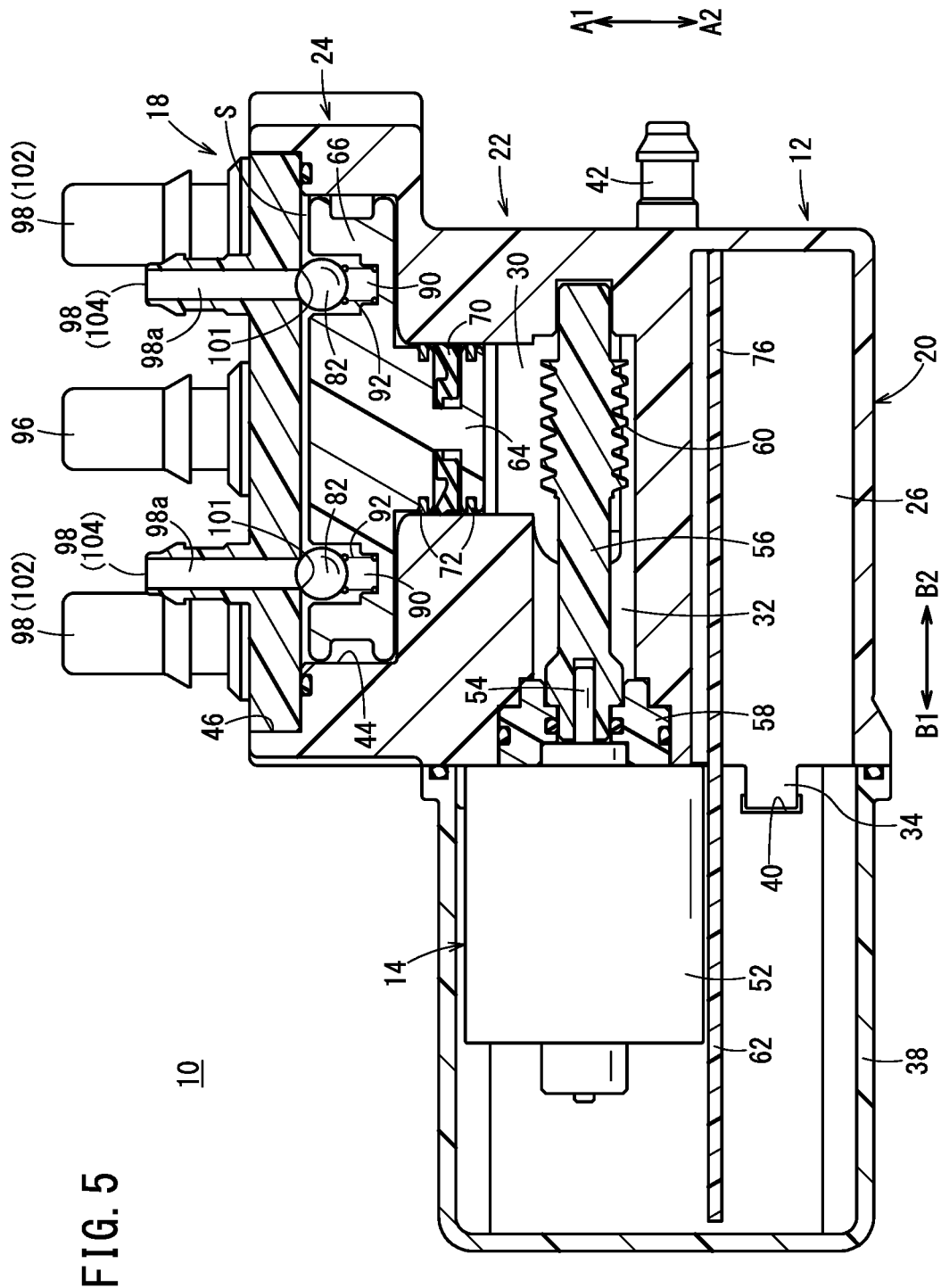
FIG. 5 is a sectional view taken along the line V-V of FIG. 3.

In the main body section 22, a first rotor housing hole (a housing hole) 30 in which part of the rotor 16 is housed and which passes through the main body section 22 in a vertical direction (an arrow A1, A2 direction) is formed in the center thereof, and the upper part thereof communicates with the housing section 24 and the lower part has a bottom without penetration into the space section 26. Moreover, the main body section 22 has, as depicted in FIGS. 2 and 5, a shaft hole 32 formed therein and having an opening formed on one side thereof and extending in a horizontal direction (an arrow B2 direction), and a drive shaft 54 of the drive section 14 and a worm gear 56, which will be described later, are housed therein. This shaft hole 32 is formed so as to be substantially parallel to the space section 26, extends so as to be substantially orthogonal to the first rotor housing hole 30, and is offset with respect to the center of the first rotor housing hole 30 by a predetermined distance.

In other words, part of the shaft hole 32 passes through the first rotor housing hole 30 laterally, and the shaft hole 32 and the first rotor housing hole 30 communicate with each other.

Moreover, one side of the main body section 22 is formed in the shape of a plane which is substantially the same plane as one side of the base section 20 as depicted in FIG. 2. Near the outer edge thereof, a plurality of hook sections 34 protrude, and on the periphery of the shaft hole 32, drive source holding sections 36 protrude for holding the drive section 14, which will be described later.

In addition, a box-shaped housing case 38 is attached so as to cover the one side of the base section 20 and the main body section 22, and a rotary drive source 52 of the drive section 14, which will be described later, is housed in the housing case 38 and the opening areas of the space section 26 and the shaft hole 32 are closed. This housing case 38 is attached so as to protrude laterally (an arrow B1 direction) from the body 12 and fixed as a result of the plurality of hook sections 34, which protrude from the one side of the main body section 22 and the base section 20, engaging in depressions 40 (see FIGS. 4 and 5) formed in the inner wall surface of the housing case 38. That is, the housing case 38 is provided in such a way that the housing case 38 can be attached to and detached from the body 12.

On the other hand, on the other side opposite to the one side of the main body section 22, as depicted in FIG. 4, a drain port 42 that protrudes in a direction (the arrow B2 direction) in which the drain port 42 extends away from the main body section 22 and has a path inside is formed. This drain port 42 extends in a substantially horizontal direction (the directions of arrows B1, B2) and the path thereof communicates with the bottom of the first rotor housing hole 30.

The housing section 24 is formed, as depicted in FIGS. 1 to 6, in the shape of a cylinder, for example, and has inside a second rotor housing hole 44 in which part of the rotor 16 is housed and a cover housing hole 46 whose diameter is increased so as to be larger than that of the second rotor housing hole 44. This second rotor housing hole 44 is circular in cross section, communicates with the first rotor housing hole 30, and is formed coaxially with the first rotor housing hole 30.

Figure 6:
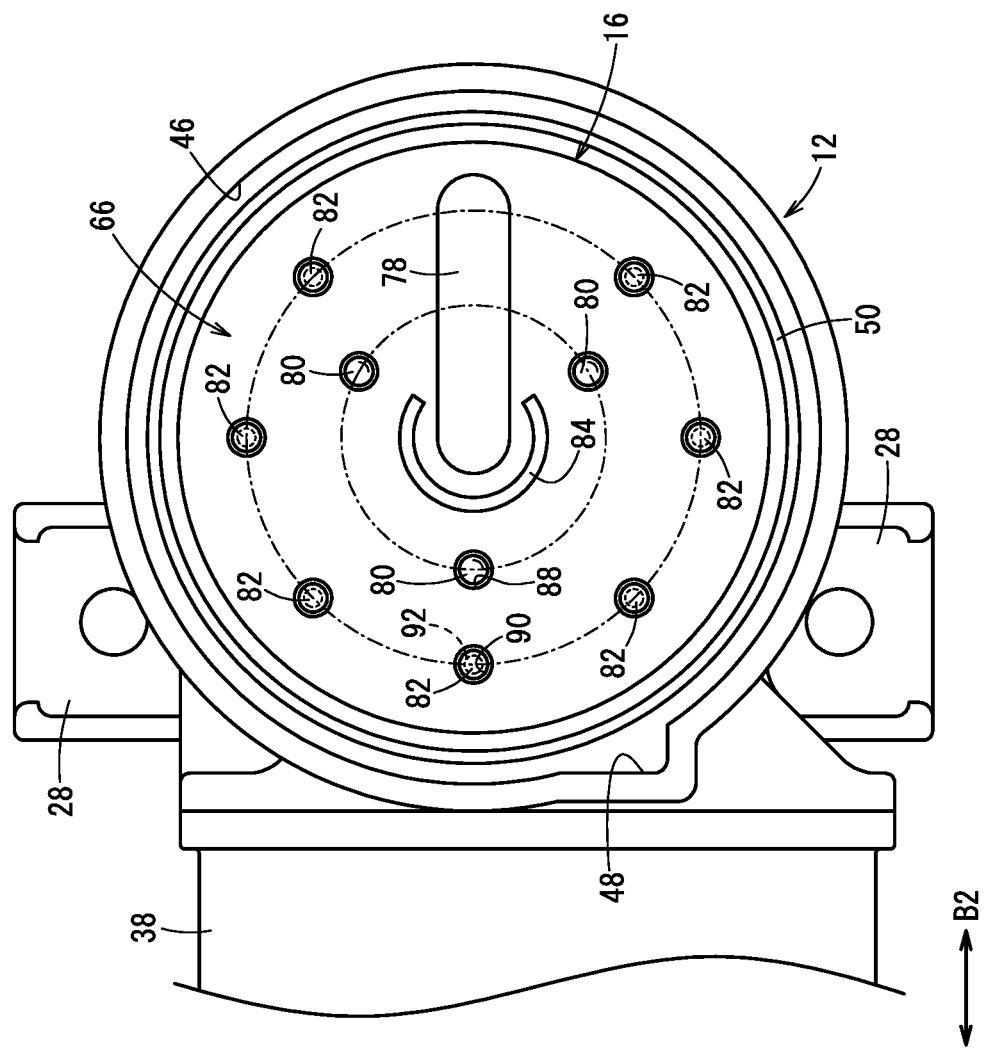
FIG. 6 is a partially-omitted plan view depicting a state in which a covering member is removed from the switching valve of FIG. 3.
Figure 7:
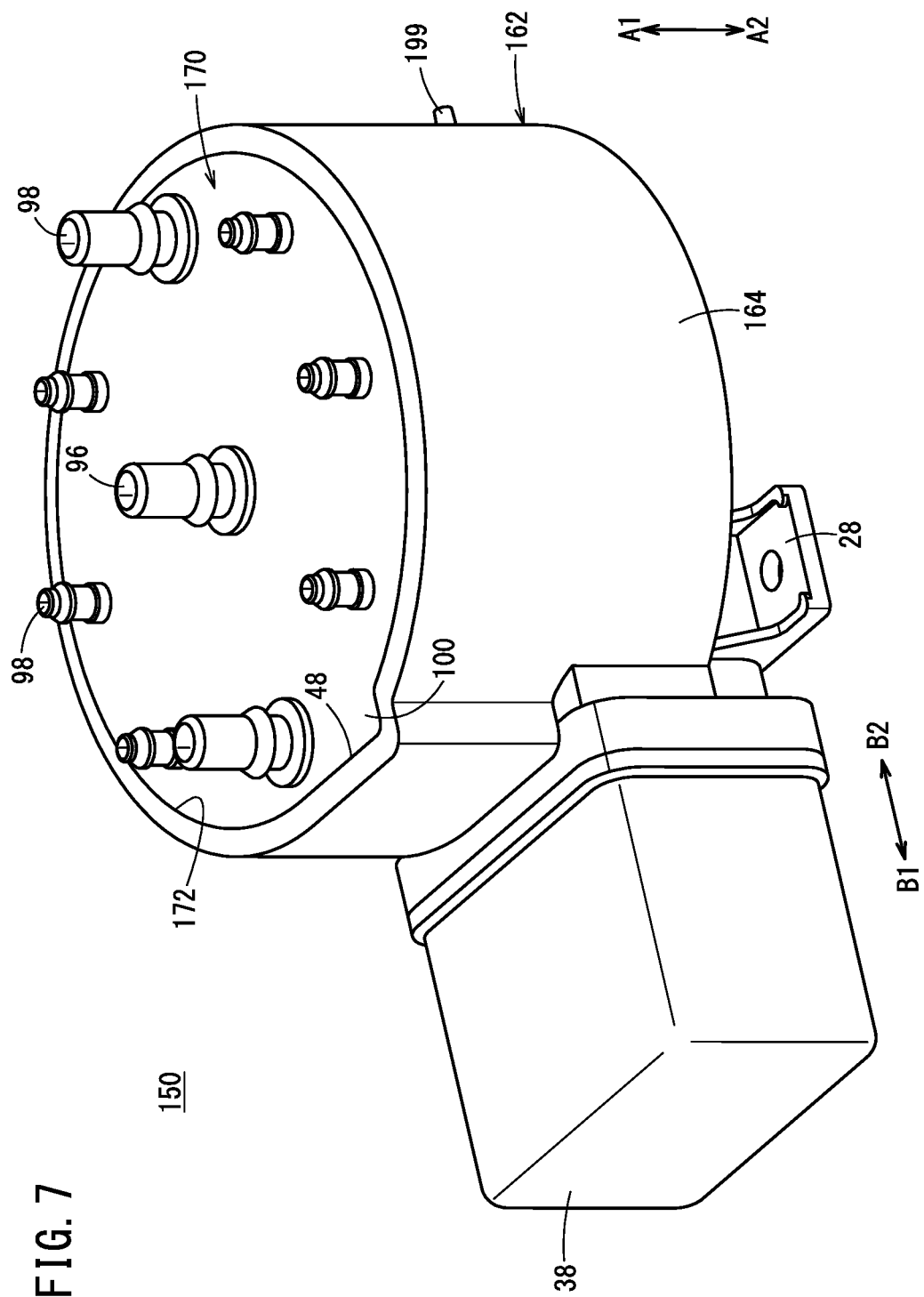
FIG. 7 is an external perspective view of a switching valve according to a second embodiment of the present invention.
Figure 8:
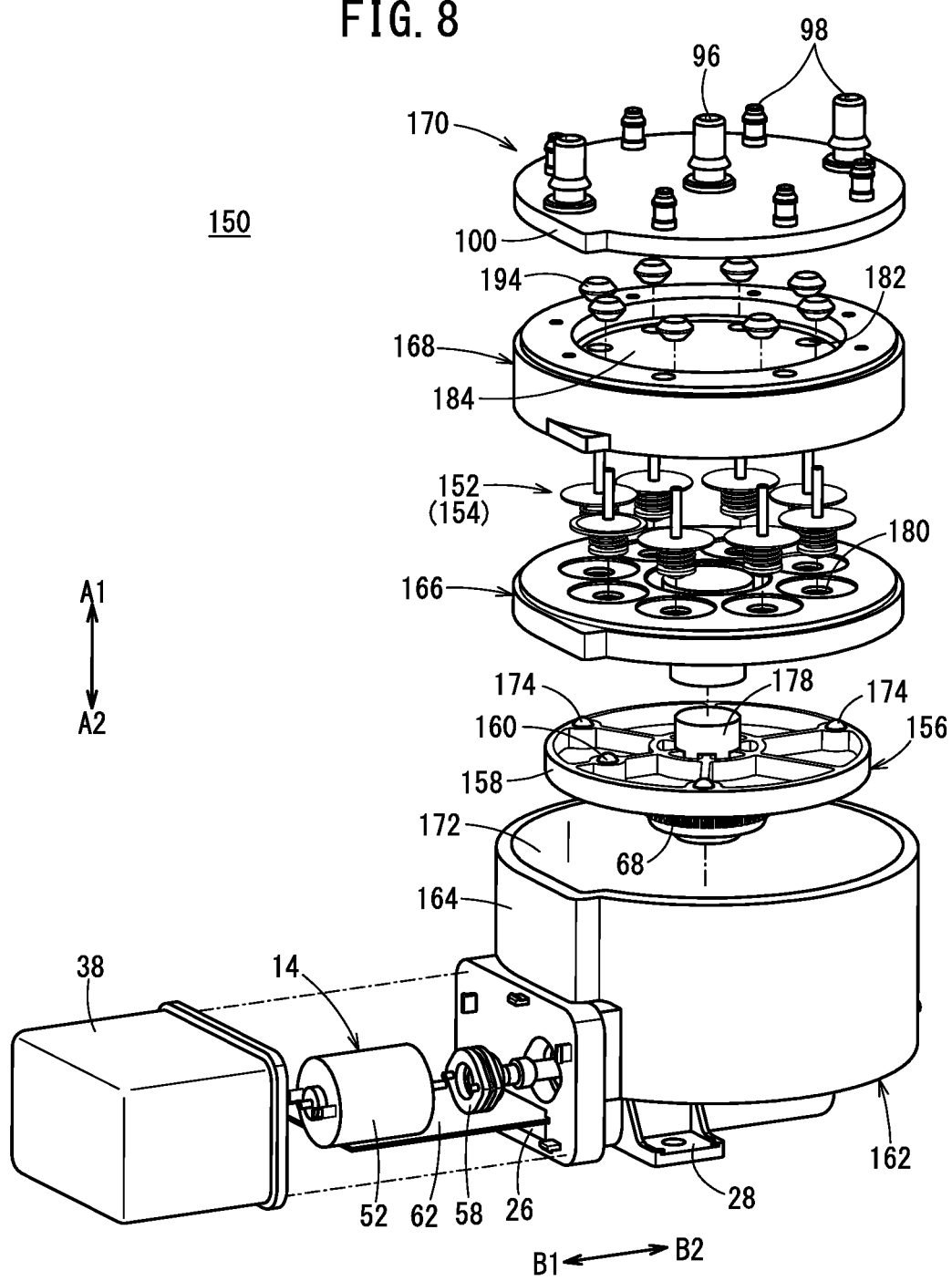
FIG. 8 is an exploded perspective view of the switching valve depicted in FIG. 7.
Figure 9:
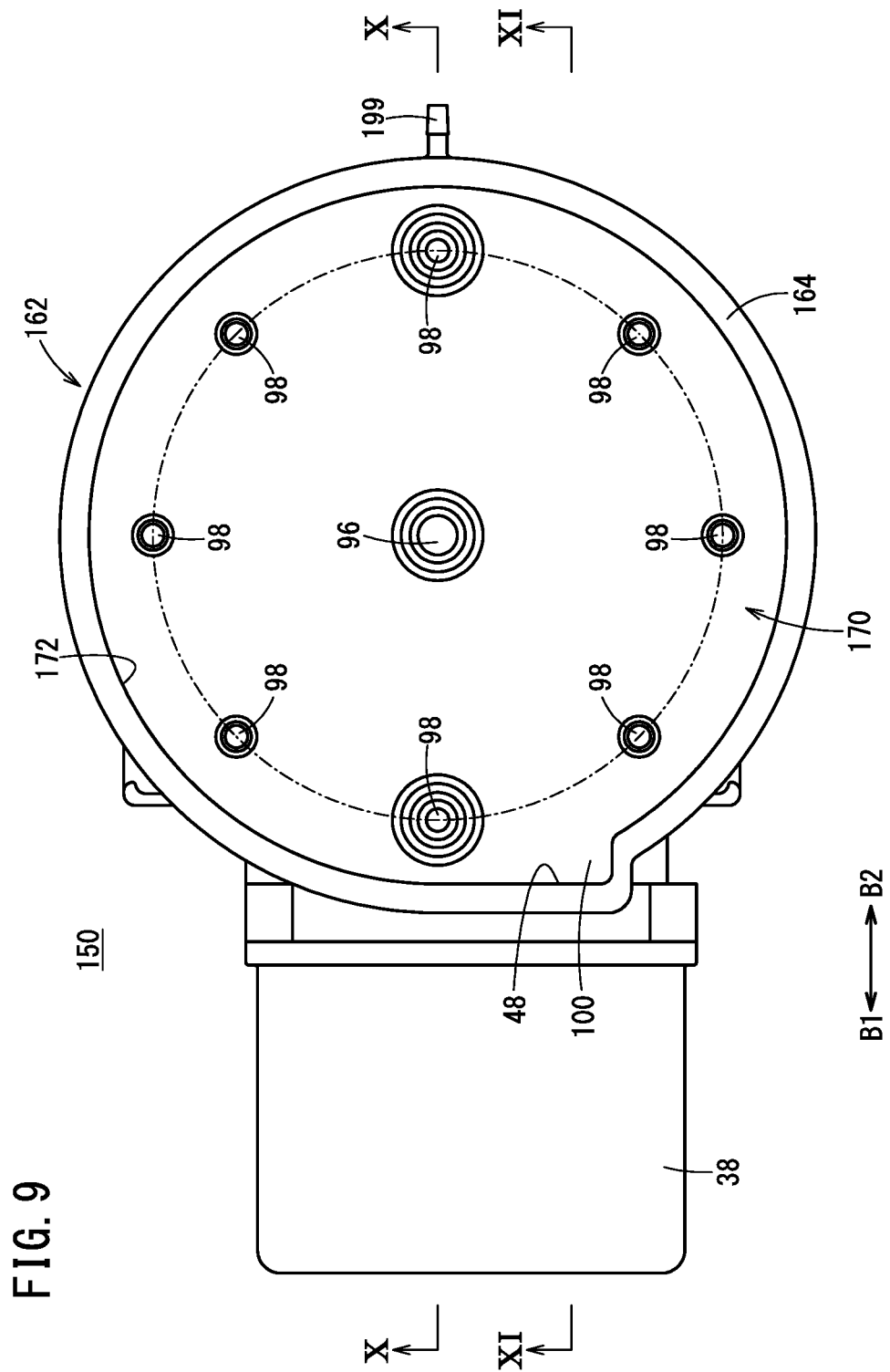
FIG. 9 is a plan view of the switching valve depicted in FIG. 7.

The cover housing hole 46 is substantially circular and formed in the upper part of the second rotor housing hole 44, and, as depicted in FIGS. 3 and 6, in an outer circumferential area thereof, a positioning groove 48 protruding radially outward so as to be triangular in cross section is formed. Moreover, in the bottom of the cover housing hole 46, as depicted in FIGS. 4 and 6, a sealing ring 50 is attached via a ring-shaped groove and makes contact with the covering member 18 when the covering member 18 is housed in the cover housing hole 46.

The drive section 14 is housed, as depicted in FIGS. 2 and 5, in the housing case 38 which is coupled to the side of the body 12, for example, and the drive section 14 is configured with the rotary drive source 52 which is driven based on a control signal from an unillustrated controller and the worm gear 56 which is provided on the drive shaft 54 of the rotary drive source 52.

This rotary drive source 52 is configured with a DC motor, for example, electrically connected to the control circuit board 62 housed in the space section 26. The rotary drive source 52 is housed in the housing case 38 in a state in which the rotary drive source 52 is held on the side of the body 12 by the drive source holding section 36. The drive shaft 54 of the rotary drive source 52 extends in the horizontal direction (the arrow B2 direction) and is inserted into the shaft hole 32 of the body 12 together with the worm gear 56 attached to the tip of the drive shaft 54.

Moreover, an end of the rotary drive source 52 is held by a holder 58 which is attached to an opening area of the shaft hole 32.

The above-described rotary drive source 52 is not limited to the DC motor and may be a stepping motor or other motors.

The worm gear 56 is formed in the shape of a shaft having a predetermined length in an axial direction (the directions of arrows B1, B2) and rotatably supported as a result of the tip thereof being inserted into a hole portion of the body 12. A driving gear 60 having spiral gear teeth is provided on the outer circumferential surface near the tip and provided in an area in which the driving gear 60 faces the first rotor housing hole 30 in the shaft hole 32.

As a result of a control signal from the unillustrated controller being input to the drive section 14 through the control circuit board 62, the drive shaft 54 of the rotary drive source 52 rotates and the worm gear 56 rotates in the shaft hole 32 together with the drive shaft 54.

The rotor 16 includes a shaft section 64 that is formed so as to have substantially the shape of a letter T in cross section, for example, and inserted into the first rotor housing hole 30 of the body 12, and a table section (an end) 66 that is formed, with a diameter increased radially outward, on the upper part of the shaft section 64 and housed in the second rotor housing hole 44. The rotor 16 is rotatably supported in a state in which the shaft section 64 is inserted into the first rotor housing hole 30.

On the outer circumferential surface of this shaft section 64, a driven gear 68 (see FIG. 4) is formed along the circumferential surface thereof, and the driving gear 60 (see FIG. 5) of the worm gear 56 exposed from an area through which the shaft hole 32 passes is made to engage the driven gear 68. That is, the driven gear 68 is provided in a position in which the driven gear 68 faces the shaft hole 32 in the first rotor housing hole 30. As a result, a rotary driving force of the drive section 14 is transferred to the rotor 16 by the action of engagement between the driving gear 60 of the worm gear 56 and the driven gear 68, and the rotor 16 rotates in the first and second rotor housing holes 30 and 44.

Moreover, on the outer circumferential surface of the shaft section 64, as depicted in FIGS. 4 and 5, in a position between the driven gear 68 and the table section 66, packing (a sealing member) 70 is attached via a ring-shaped groove, and a pair of ring-shaped grooves adjacent to the packing 70 is charged with a lubricant 72 such as grease. When the shaft section 64 rotates in the first rotor housing hole 30, flow of liquid through a gap between the rotor 16 and the body 12 is prevented by the packing 70, and the lubricant 72 reduces sliding resistance of the shaft section 64 and prevents wear or the like.

Meanwhile, in the center of the lower end of the shaft section 64, as depicted in FIG. 4, for example, a detected object 74 such as a magnet is provided, and a detection sensor 76 is provided in the control circuit board 62 so as to face the detected object 74. This detection sensor 76 is, for example, a magnetic sensor that can detect the magnetism of the detected object 74, and, by detecting the magnetism of the detected object 74 when the rotor 16 rotates, the angle of rotation is determined. The angle of rotation of the rotor 16 is not limited to a case in which the angle of rotation of the rotor 16 is detected by a magnetic detection method using a magnet and may be detected by using other detection methods.

The table section 66 is formed in the shape of a disk having a predetermined thickness, and, as depicted in FIGS. 2 to 4, in the upper surface thereof, a communicating groove (a communicating path) 78 extending radially outward from the center is formed, and, in positions located outside the center in a radial direction, a plurality of guide balls (a guide body) 80 are provided on the circumference of a circle and a plurality of valve bodies 82 are provided on the circumference of a circle which is located outside the guide balls 80 in a radial direction (see FIG. 6).

This communicating groove 78 is linearly formed in the upper surface of the table section 66 to a predetermined depth in a radial direction. Moreover, from the upper surface of the table section 66, a guide section 84 which is circular arc-shaped in cross section protrudes so as to surround one end of the communicating groove 78 on the center side of the table section 66 and is inserted into a guide groove 86 of the covering member 18, which will be described later.

The guide balls 80 are, for example, steel balls formed of a material made of metal; as depicted in FIGS. 4 and 6, the guide balls 80 are rotatably inserted into first ball grooves 88, each being formed in the upper surface of the table section 66 to a predetermined depth, and part of each of the guide balls 80 protrudes from the upper surface by a predetermined height.

The valve bodies 82 are, for example, steel balls formed of a material made of metal; as depicted in FIGS. 4 to 6, the valve bodies 82 are inserted into second ball grooves 90 formed in positions closer to the outer edge than the first ball grooves 88, and, between the bottom of each second ball groove 90 and each of the valve bodies 82, a spring (a resilient member) 92 is interposed. Moreover, each valve body 82 is formed so as to have a diameter larger than that of a pipe line 98a of a lead-out port 98 in the covering member 18, which will be described later (see FIGS. 4 and 5).

The spring 92 is a coil spring, for instance, and biases the valve body 82 in a direction (the arrow A1 direction) in which the valve body 82 is moved away from the second ball groove 90, that is, toward the side where the covering member 18 is located. In other words, the resilient force of the spring 92 is biased in the axial direction (the arrow A1 direction) of the rotor 16.

The covering member 18 is housed in the cover housing hole 46 of the housing section 24 in the body 12, for example, and configured with a disk-shaped plate section 94, an introduction port 96 which is provided in the center of the plate section 94, and a plurality of (for example, eight) lead-out ports 98 which are provided in positions outside the introduction port 96 in a radial direction.

The plate section 94 is formed substantially in the shape of a circle having a predetermined thickness, and, as depicted in FIGS. 4 and 5, by being inserted into the cover housing hole 46, the plate section 94 is placed in a state in which the plate section 94 is flush with the end face of the housing section 24, and the bottom face (an inner wall surface) of the plate section 94 faces the upper surface of the table section 66 of the rotor 16 and makes contact with the plurality of guide balls 80 with a space S (see FIGS. 4 and 5) left therebetween.

As described above, as a result of the guide balls 80 making contact with the bottom face of the covering member 18, direct contact between the table section 66 of the rotor 16 and the bottom face of the covering member 18 is avoided, and the rotor 16 rotates smoothly and stably with respect to the covering member 18 by the action of contact with the guide balls 80 which are rotatably provided.

Moreover, the plate section 94 has, as depicted in FIG. 3, a positioning section 100 which protrudes radially outward from the outer circumferential surface of the plate section 94, and, as a result of the positioning section 100 engaging in the positioning groove 48 when the plate section 94 is inserted into the cover housing hole 46, rotation of the covering member 18 with respect to the body 12 is regulated.

Furthermore, in the bottom face of the plate section 94, as depicted in FIG. 4, a ring-shaped guide groove 86 is formed in a position outside the introduction port 96 in a radial direction, and the guide section 84 of the rotor 16 is inserted thereinto. As a result, when the rotor 16 rotates in the body 12, as a result of the guide section 84 rotating along the guide groove 86, the rotor 16 is in a state in which the rotor 16 is always kept so as to be coaxial with the center of the covering member 18. In other words, the rotor 16 rotates in a state in which the rotor 16 is always radially positioned with respect to the covering member 18.

As depicted in FIGS. 1 to 4, the introduction port 96 is formed as a tubular body which stands upright on the plate section 94, and a pipe line 96a inside the introduction port 96 passes through the plate section 94 to the bottom face thereof and an introduction tube (which is not depicted in the drawing) is connected from the tip side of the pipe line 96a. This introduction tube is connected to, for example, an unillustrated liquid supply source. When the covering member 18 is attached to the body 12, the introduction port 96 is positioned so as to face one end of the communicating groove 78 in the rotor 16 (see FIG. 3).

As with the introduction port 96, the lead-out ports 98 are each formed as a tubular body which stands upright on the plate section 94, and, as depicted in FIG. 3, the lead-out ports 98 are placed on the circumference of a circle having a predetermined diameter, whose center coincides with the introduction port 96, and provided so as to be separated from one another at regular intervals on the circumference of the circle. Each lead-out port 98 has the pipe line 98a that is formed therein and passes through the plate section 94 to the bottom face thereof, and, as depicted in FIGS. 4 and 5, a seat section 101 with which each valve body 82 makes contact is provided in an opening area of the bottom face of the lead-out port 98 and an unillustrated lead-out tube is connected to the outside of the lead-out port 98 from the tip side.

This lead-out tube is connected to each device, each area, and so forth to which the liquid from the introduction port 96 has to be selectively supplied.

Moreover, the lead-out ports 98 include, as depicted in FIGS. 1 to 3, two first ports 102, each being formed so as to have substantially the same tube diameter as that of the introduction port 96, and six second ports 104, each being formed so as to have a diameter which is smaller than that of the first port 102. These two first ports 102 are placed in a linear arrangement with the introduction port 96 placed therebetween, and the second ports 104 are provided in such a way that three respective second ports 104 are located between one first port 102 and the other first port 102.

The tube diameters of the lead-out ports 98 including the above-described first and second ports 102 and 104 are appropriately set in accordance with the flow rate of the liquid which is led out to each device or the like connected via the unillustrated lead-out tube; for instance, the tube diameters of the plurality of lead-out ports 98 may be the same or the tube diameters of all the lead-out ports 98 may be different from one another. Furthermore, the number of lead-out ports 98 may also be appropriately set at an as-needed number in a like manner.

In addition, the lead-out ports 98 are provided on the circumference of a circle, whose diameter is the same as the circumference of a circle on which the valve bodies 82 are provided in the rotor 16, and at the same pitch as the valve bodies 82 in a circumferential direction. They are placed in such a way that if one of the plurality of lead-out ports 98 is in a position in which the lead-out port 98 faces the communicating groove 78 of the rotor 16, then all of the remaining lead-out ports 98 face the valve bodies 82. That is, as depicted in FIG. 3, when one of the eight lead-out ports 98 communicates with the introduction port 96 via the communicating groove 78, the remaining seven lead-out ports 98 face the valve bodies 82.

Since the valve bodies 82 are biased by the springs 92 toward the side where the covering member 18 is located (the arrow A1 direction), the state enters a valve-closed state in which the lead-out ports 98 are closed as a result of the valve bodies 82 making contact with the seat sections 101 of the lead-out ports 98 and being pressed against them.

The above-described covering member 18 is housed in the cover housing hole 46 of the body 12 in a state in which the bottom face of the plate section 94 faces the table section 66 of the rotor 16 and the introduction port 96 and the lead-out ports 98 protrude in a direction (the arrow A1 direction) in which the introduction port 96 and the lead-out ports 98 extend away from the body 12. The covering member 18 is integrally fixed thereto by welding or the like, and, as a result of the sealing ring 50 of the cover housing hole 46 making contact with the bottom face, leakage of the liquid to the outside through a gap between the covering member 18 and the body 12 is prevented and entry of dust or the like into the body 12 from the outside is also prevented.

The method of fixing the covering member 18 to the body 12 is not limited to the above-described welding; for example, the covering member 18 may be bonded to the body 12 by using an adhesive and a fixing method is not limited to a particular method.

The switching valve 10 according to the first embodiment of the present invention is basically configured as described above; next, an operation and the workings and effect thereof will be described. As depicted in FIG. 3, a state in which the communicating groove 78 of the rotor 16 extends in the directions of arrows B1, B2 and the first port 102 of the lead-out ports 98 and the introduction port 96 communicate with each other via the communicating groove 78 is assumed to be an initial state. A case in which, for example, liquid which is supplied is washer fluid that is used to clean, for instance, a windshield of a vehicle and switching of the supply state thereof is performed, will be described.

Moreover, in this case, the introduction port 96 is connected, via an introduction tube (not depicted in the drawing), to a tank in which the washer fluid is stored. The plurality of lead-out ports 98 are connected, via the lead-out tubes (not depicted in the drawing), to washer nozzles for spraying the washer fluid onto areas such as a windshield.

First, of the plurality of lead-out ports 98, a lead-out port 98 to which the washer fluid (the liquid) is to be supplied is selected, and a control signal based thereon is input to the rotary drive source 52 of the drive section 14 through the control circuit board 62 from the unillustrated controller. Then, as a result of the rotary drive source 52 performing driving based on this control signal, the drive shaft 54 and the worm gear 56 rotate in a predetermined direction by a predetermined amount, and the rotor 16 turns a predetermined angle in the body 12 in a clockwise direction (an arrow C direction in FIG. 3) by the action of engagement between the driving gear 60 and the driven gear 68.

As a result, with the rotation of the rotor 16, the plurality of valve bodies 82 are separated from the seat sections 101 of the lead-out ports 98 on which the valve bodies 82 are seated and move by being pressed downward (an arrow A2 direction) by the bottom face of the plate section 94 against the resilient force of the springs 92. In this case, since the washer fluid which is supplied to the introduction port 96 is not pressurized, even in a state in which the space S between the rotor 16 and the covering member 18 is filled with this washer fluid, the washer fluid is not led out from the lead-out ports 98 which are in an opened state as a result of separation of the valve bodies 82.

Then, by detecting the detected object 74 of the rotor 16 by the detection sensor 76, it is determined that the other end of the communicating groove 78 is located in a position in which the other end faces a desired lead-out port 98 by further rotation of the rotor 16 and in a position in which the communicating groove 78 communicates with the introduction port 96 (see a shape indicated by a chain double-dashed line in FIG. 3), and the output of the control signal to the drive section 14 from the unillustrated controller is stopped. As a result, the rotation of the rotor 16 is stopped in a state in which the introduction port 96 and a new lead-out port 98 communicate with each other by the communicating groove 78.

Moreover, at the same time, as a result of the valve bodies 82 being located in positions in which the valve bodies 82 face other lead-out ports 98 different from those in the initial state and pressed against the seat sections 101 by the resilient force of the springs 92, the pipe lines 98a of the lead-out ports 98 are closed.

As a result, the state enters a valve-closed state (a non-communicating state) in which the lead-out ports 98 other than the lead-out port 98 through which the washer fluid is led out are closed.

As described above, in a state in which the lead-out port 98 is switched to another, the washer fluid in a pressurized state is supplied to the introduction port 96 from the unillustrated tank via the introduction tube, and is then supplied to a desired washer nozzle through the lead-out tube after passing through a new lead-out port 98, to which the lead-out port 98 is switched, through the communicating groove 78. As a result, the washer fluid is supplied to the washer nozzle through the other lead-out port 98 which is different from the lead-out port 98 in the initial state of the switching valve 10 and then sprayed onto a desired area of a vehicle, whereby the area is cleaned.

Moreover, since the valve bodies 82 make contact with the seat sections 101 of the remaining lead-out ports 98 other than the above-described lead-out port 98 and are pressed against the seat sections 101 by the action of resilience of the springs 92, there is no possibility of leakage of the washer fluid present in the space S between the rotor 16 and the covering member 18.

The rotor 16 is not limited to the above-described case in which the rotor 16 rotates in a clockwise direction (the arrow C direction in FIG. 3); for example, by changing the direction of rotation of the drive section 14 by controlling the control signal to the drive section 14 in accordance with the position of a lead-out port 98 to be switched to, it is possible to rotate the rotor 16 in both clockwise and counterclockwise directions.

Moreover, even if the liquid flowing into the space between the table section 66 of the rotor 16 and the covering member 18 enters the bottom of the first rotor housing hole 30 by passing through the packing 70 provided in the shaft section 64 of the rotor 16, since the liquid can be discharged to the outside through the drain port 42 communicating with the bottom, the liquid is reliably prevented from entering the side where the drive section 14 and the control circuit board 62 are located, which are provided below the first rotor housing hole 30.

Furthermore, in place of providing the springs 92 that bias the valve bodies 82 toward the seat sections 101 of the lead-out ports 98, the valve bodies 82 may be seated on the seat sections 101 by being pressed toward the side where the seat sections 101 are located by the pressure of the liquid flowing into the space S between the rotor 16 and the covering member 18. Since this configuration can eliminate the need for the springs 92, it is possible to achieve a reduction in the number of parts.

In addition, the valve bodies 82 are not limited to the above-described case in which the valve bodies 82 are each formed of a material made of metal; for example, an elastic material such as rubber, a material made of resin, or a steel ball lined or covered with rubber may be used. As described above, by using the valve bodies formed of an elastic material or the like, when, for instance, low viscosity liquid which leaks easily is handled, it is possible to achieve further enhancement of sealing performance which is obtained when the valve bodies are seated on the lead-out ports 98.

Furthermore, the valve bodies 82 are not limited to a case in which the valve bodies 82 are each formed as a spherical body, and the shape of the valve body 82 is not limited to a particular shape as long as, for example, only an area thereof that closes the seat section 101 of the lead-out port 98 is formed as a spherical body.

In addition, lining or covering the seat sections 101 of the lead-out ports 98 with an elastic body such as rubber is effective because this can achieve further enhancement of sealing performance when the valve bodies 82 make contact with the seat sections 101.

Moreover, since it is possible to reduce the number of lead-out ports 98 only by replacing the covering member 18 with a new covering member 18 having a different number of lead-out ports 98, there is no need to replace the whole switching valve with another, which makes it possible to curb capital spending.

As described above, in the first embodiment, by providing the space S of a predetermined spacing between the rotor 16 which is rotatably provided in the body 12 constituting the switching valve 10 and the bottom face of the covering member 18 that closes the housing section 24 of the body 12 and by providing the guide balls 80, which make contact with the covering member 18, in the table section 66 of the rotor 16, since the rotor 16 does not slide directly on the covering member 18 when rotating, there is no need to apply a lubricant such as grease to the rotor 16 and the covering member 18 as in a conventional switching valve.

As a result, even when the liquid introduced from the introduction port 96 flows into a gap between the covering member 18 and the rotor 16, the liquid does not come into contact with the lubricant, which prevents contamination of the liquid by the lubricant and makes it possible to supply the liquid to areas from the lead-out ports 98 as the liquid just like it was introduced from the introduction port 96.

Moreover, by avoiding sliding of the rotor 16 on the covering member 18, it is possible to prevent the occurrence of an unusual sound or wear, and, in addition thereto, a situation is avoided in which, if a foreign material or the like gets mixed in with the liquid, the foreign material is sandwiched between the covering member 18 and the rotor 16 and dragged and a scratch is made thereby. This makes it possible to enhance the durability of the rotor 16 and the covering member 18 and accordingly enhance the durability of the switching valve 10. The space S is set so as to have a larger value than a foreign material which possibly gets mixed in with the liquid.

Furthermore, in the end face of the table section 66 of the rotor 16, the plurality of valve bodies 82 are provided for facing and closing lead-out ports 98 other than a certain lead-out port 98 facing the communicating groove 78, the certain lead-out port 98 from which the liquid is led out, and the springs 92 are provided for biasing the valve bodies 82 toward the side where the lead-out ports 98 are located in order to close the other lead-out ports 98 by the valve bodies 82 by the action of resilience of the springs 92. Thus, leakage of the liquid from the lead-out ports 98 which are not the lead-out port 98 from which the liquid is led out is reliably prevented. Moreover, as compared to the conventional switching valve that performs sealing by bringing the valve body into contact with the valve seat surface, it is possible to obtain stable sealing performance for a longer period of time because the sealing performance does not decrease due to wear or the like, which makes it possible to achieve enhancement of the sealing performance.

In addition, by adopting a structure in which the space S is provided between the table section 66 of the rotor 16 and the covering member 18, as compared to the conventional switching valve that brings the valve body and the valve seat surface into contact with each other, there is no need to ensure high surface accuracy for the valve body and the valve seat surface, which eliminates the need for, for instance, machining for obtaining surface accuracy and thereby makes it possible to reduce production costs and the production time.

Furthermore, since it is possible to rotate the rotor 16 smoothly by the plurality of guide balls 80 without causing the rotor 16 to slide on the covering member 18, a large driving force is not needed to rotate the rotor 16, which makes it possible to make the drive section 14 smaller compared to a conventional switching valve and achieve power savings.

Moreover, the guide balls 80 which are provided in the rotor 16 are not limited to a case in which the guide balls 80 are provided in the upper surface of the table section 66 as described above; for example, the guide balls 80 may be provided in the lower surface of the table section 66 and brought into contact with the bottom of the second rotor housing hole 44, or the guide balls 80 may be provided at the lower end of the shaft section 64 and brought into contact with the bottom of the first rotor housing hole 30. That is, an area in which the guide balls 80 are provided is not limited to a particular area as long as the guide balls 80 are provided in such a way as to make contact with the body 12 in the rotor 16.

Next, a switching valve 150 according to a second embodiment is depicted in FIGS. 7 to 12. The same component elements as those of the above-described switching valve 10 according to the first embodiment will be identified with the same reference characters and the detailed explanations thereof will be omitted.

This switching valve 150 according to the second embodiment differs from the switching valve 10 according to the first embodiment in that the switching valve 150 includes valve bodies 154 formed as a plurality of poppet valves 152 in place of the valve bodies 82 formed as spherical bodies and makes the poppet valves 152 perform an opening operation by selectively pressing the poppet valves 152 by a projection 160 provided in a table section 158 of a rotor (a rotating body) 156.

In this switching valve 150, as depicted in FIGS. 7 to 12, the rotor 156, first and second holder plates 166 and 168, and a covering member (a body) 170 are housed in a housing section 164 of a body 162 thereof, and the first and second holder plates 166 and 168 and the covering member 170 are fixed in a state in which the rotation thereof with respect to a housing hole 172 is regulated.

In the table section 158 of this rotor 156, near the outer edge thereof, a plurality of guide balls (a guide body) 174 are provided so as to protrude upward (an arrow A1 direction), and the projection 160 is provided in a position closer to the inside than the outer edge by a predetermined radius. Three guide balls 174 are provided so as to be separated from one another at regular intervals in the circumferential direction of the rotor 156, for example. The projection 160 is formed as a spherical body, which is about half-embedded in the table section 158, for example, and provided so as be located between the two adjacent guide balls 174.

A space S of a predetermined spacing (see FIG. 10) is provided between the table section 158 of the rotor 156 and the bottom face of the first holder plate 166, and the guide balls 174 are in contact with the bottom face.

The first holder plate 166 is formed in the shape of a disk, for example, and provided above (the arrow A1 direction) the table section 158 of the rotor 156 so as to cover the table section 158, and a protrusion 178 of the rotor 156 is inserted into a depression 176 formed in the center of the first holder plate 166.

Meanwhile, on the radially outer side of the first holder plate 166 with the depression 176 being located at the center thereof, a first valve hole 180 in which part of the poppet valve 152 is housed is formed. A plurality of first valve holes 180 are provided on a predetermined diameter with the depression 176 being located at the center thereof, in such a way that the first valve holes 180 are separated from one another at regular intervals in the circumferential direction. In addition, the first valve holes 180 are formed so as to face the projection 160 at the time of rotation of the rotor 156. The first valve holes 180 may not be provided at regular intervals in the circumferential direction.

The second holder plate 168 is provided so as to be located above (the arrow A1 direction) the first holder plate 166 and includes a plurality of second valve holes 182 which face the first valve holes 180 of the first holder plate 166, and the second valve holes 182 pass through the second holder plate 168 in the thickness direction thereof (directions of arrows A1, A2). Each second valve hole 182 is formed so as to have a diameter which is largest on the side where the first holder plate 166 is located (an arrow A2 direction) and is gradually reduced in a direction (the arrow A1 direction) in which the second valve hole 182 extends away from the first holder plate 166, and extends to an opening of the second valve hole 182 with a fixed diameter toward the side where the covering member 170 is located (the arrow A1 direction).

Moreover, in the upper surface of the second holder plate 168, a communicating chamber (a communicating path) 184 with a depression in substantially the central part thereof is formed, and the communicating chamber 184 communicates with the introduction port 96 provided in the covering member 170 and communicates with each of the ends of the second valve holes 182.

Furthermore, in the second holder plate 168, a plurality of communicating holes (a communicating path) 186 are formed so as to be closer to the radially outer side than the communicating chamber 184 and formed so as to face the lead-out ports 98 of the covering member 170, and the communicating holes 186 are formed linearly toward the covering member 170 and extend so as to bend toward the radial inside and communicate with the second valve holes 182. That is, the communicating holes 186 are provided so that the number thereof becomes equal to the number of the second valve holes 182 and the number of the lead-out ports 98.

Figure 10:
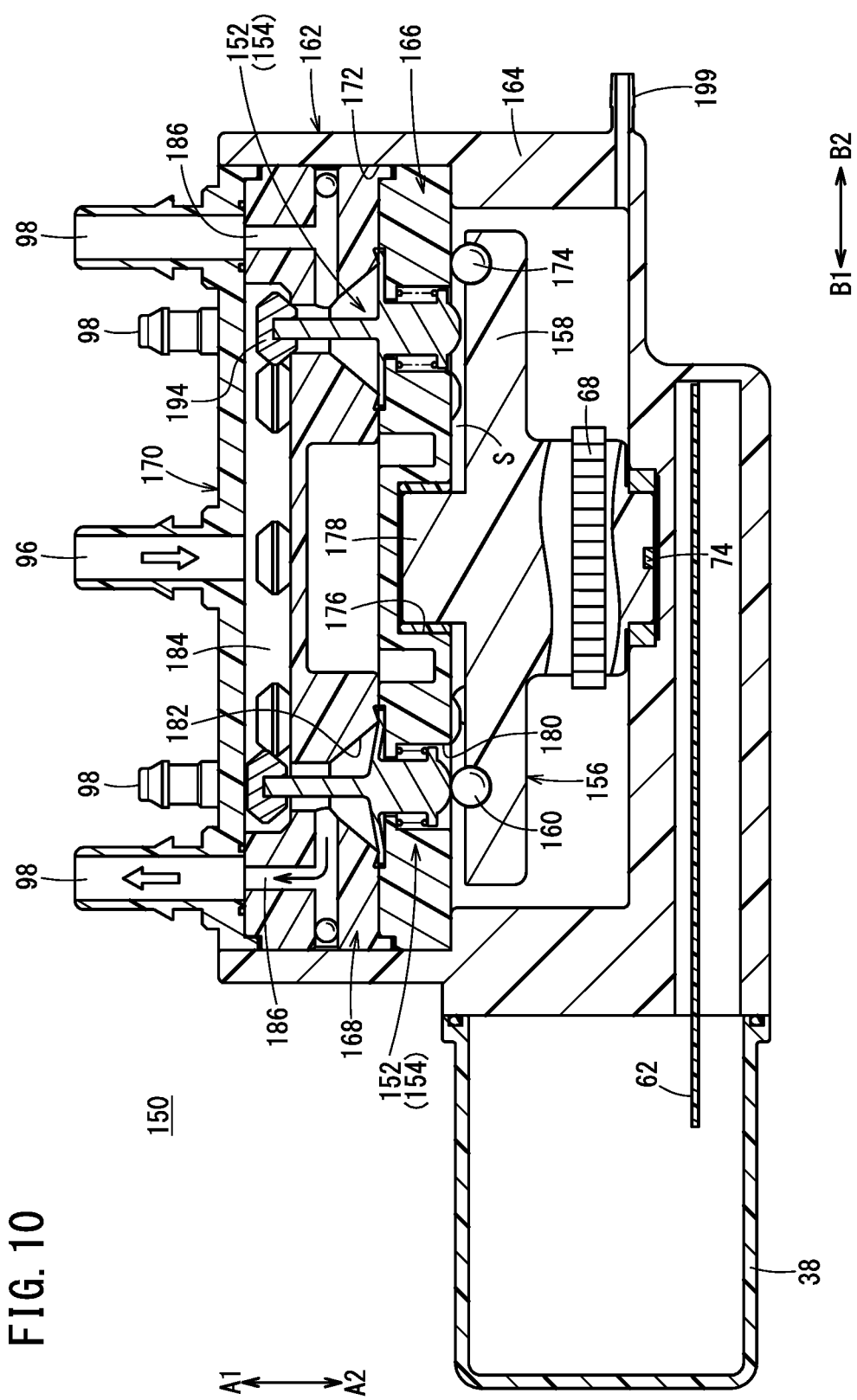
FIG. 10 is a sectional view taken along the line X-X of FIG. 9.
Figure 11:
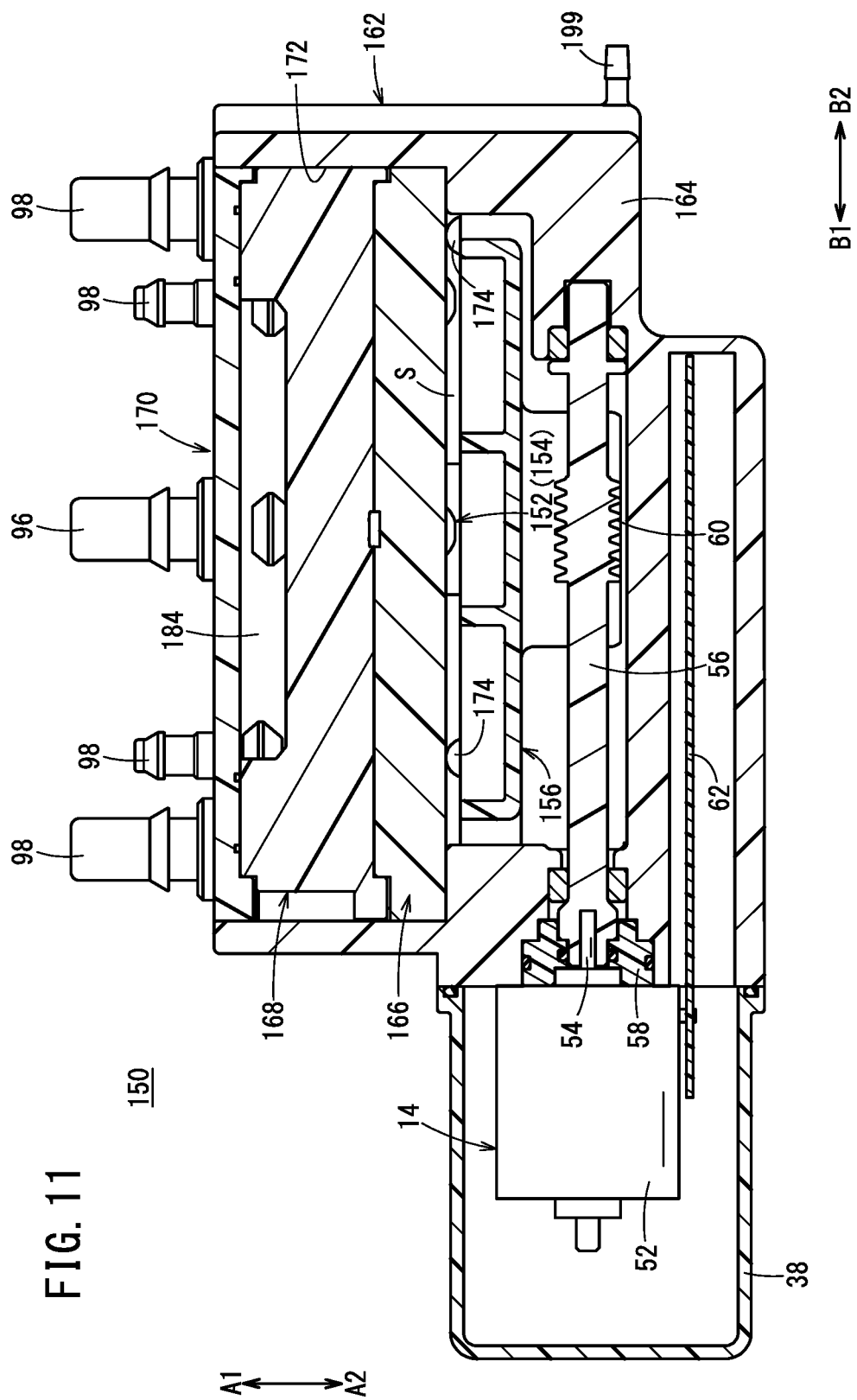
FIG. 11 is a sectional view taken along the line XI-XI of FIG. 9.
Figure 12:
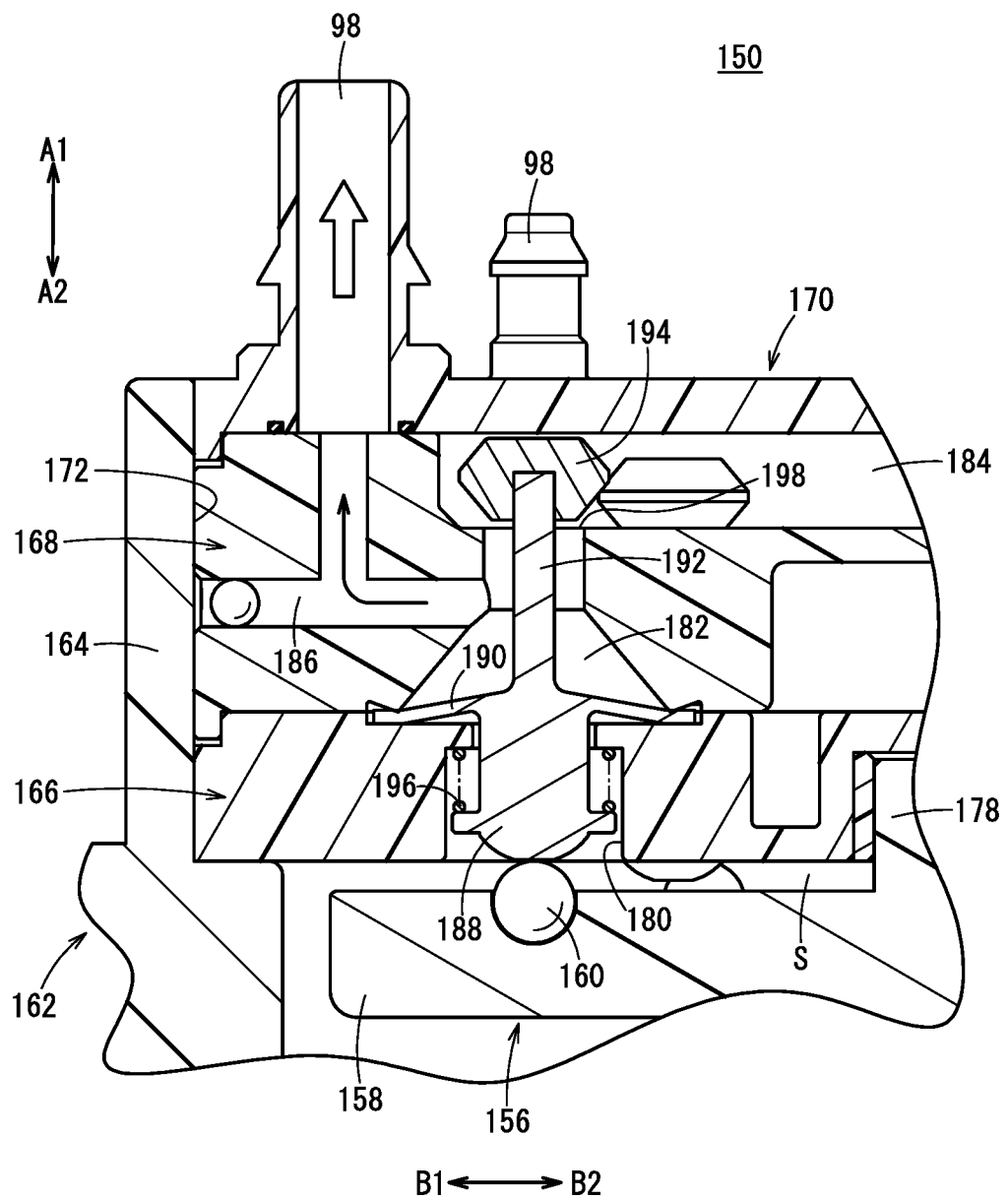
FIG. 12 is an enlarged sectional view depicting an area near a lead-out port in FIG. 10.
Figure 13:
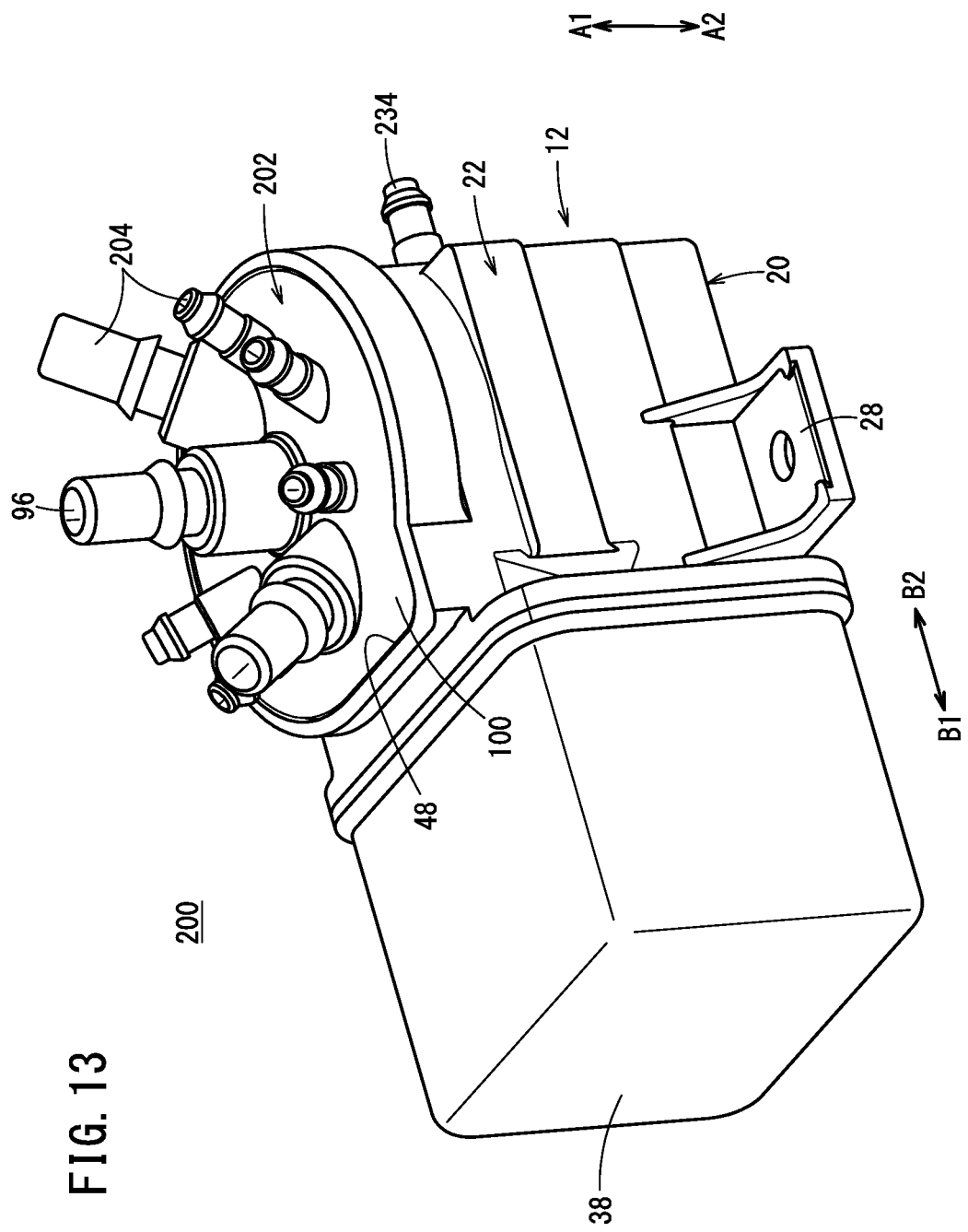
FIG. 13 is an external perspective view of a switching valve according to a third embodiment of the present invention.
Figure 14:
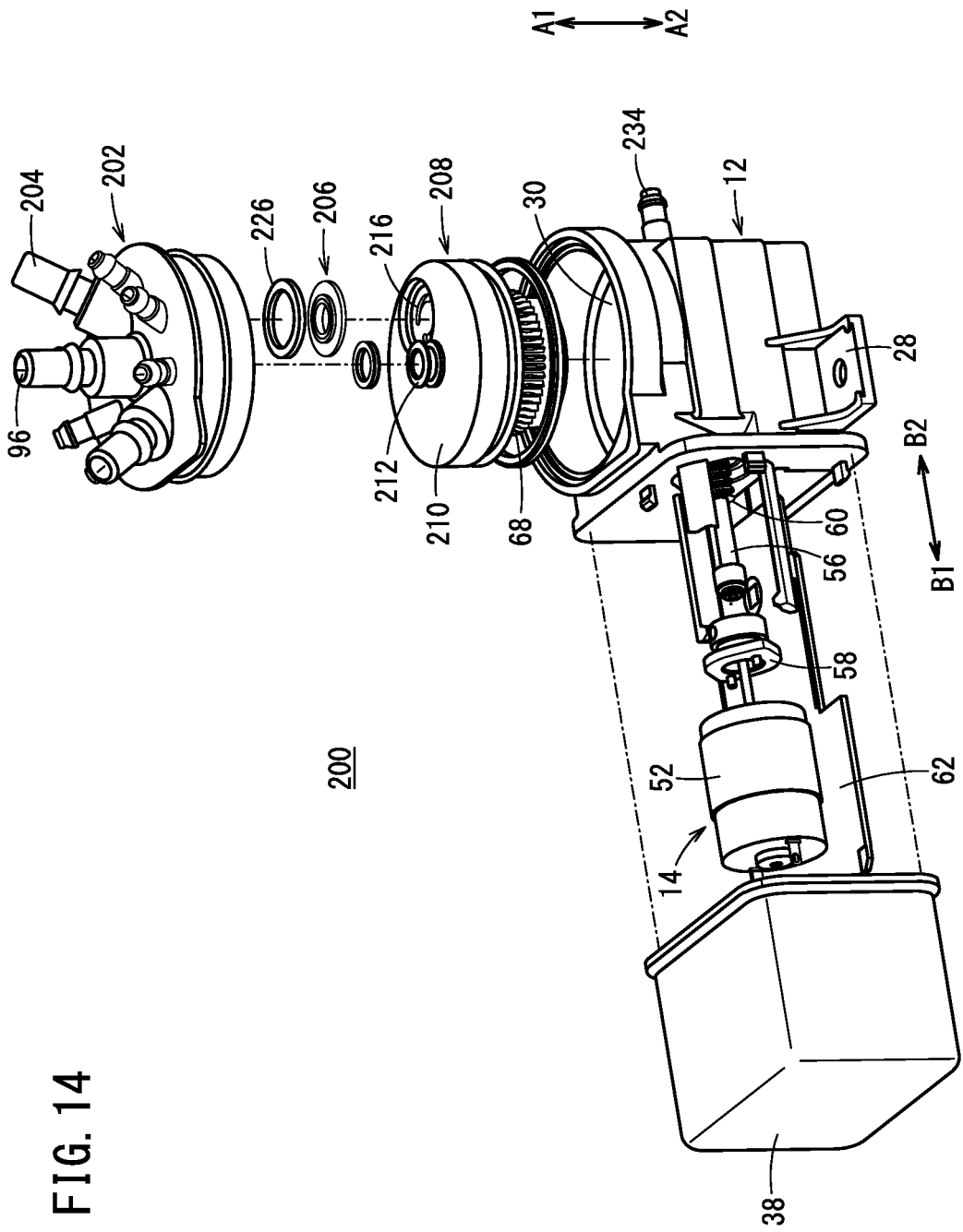
FIG. 14 is an exploded perspective view of the switching valve depicted in FIG. 13.
Figure 15:
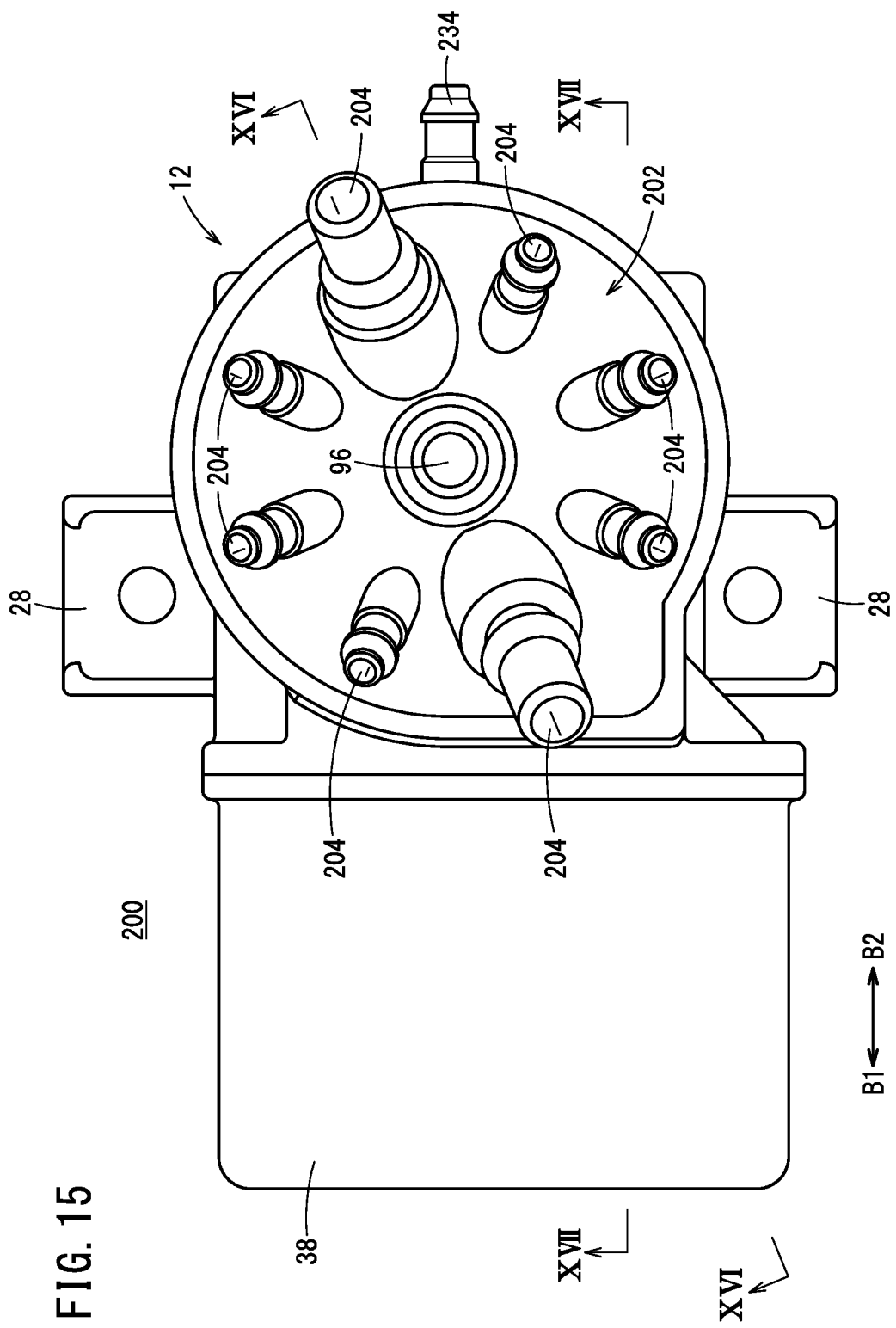
FIG. 15 is a plan view of the switching valve depicted in FIG. 13.
Figure 16:
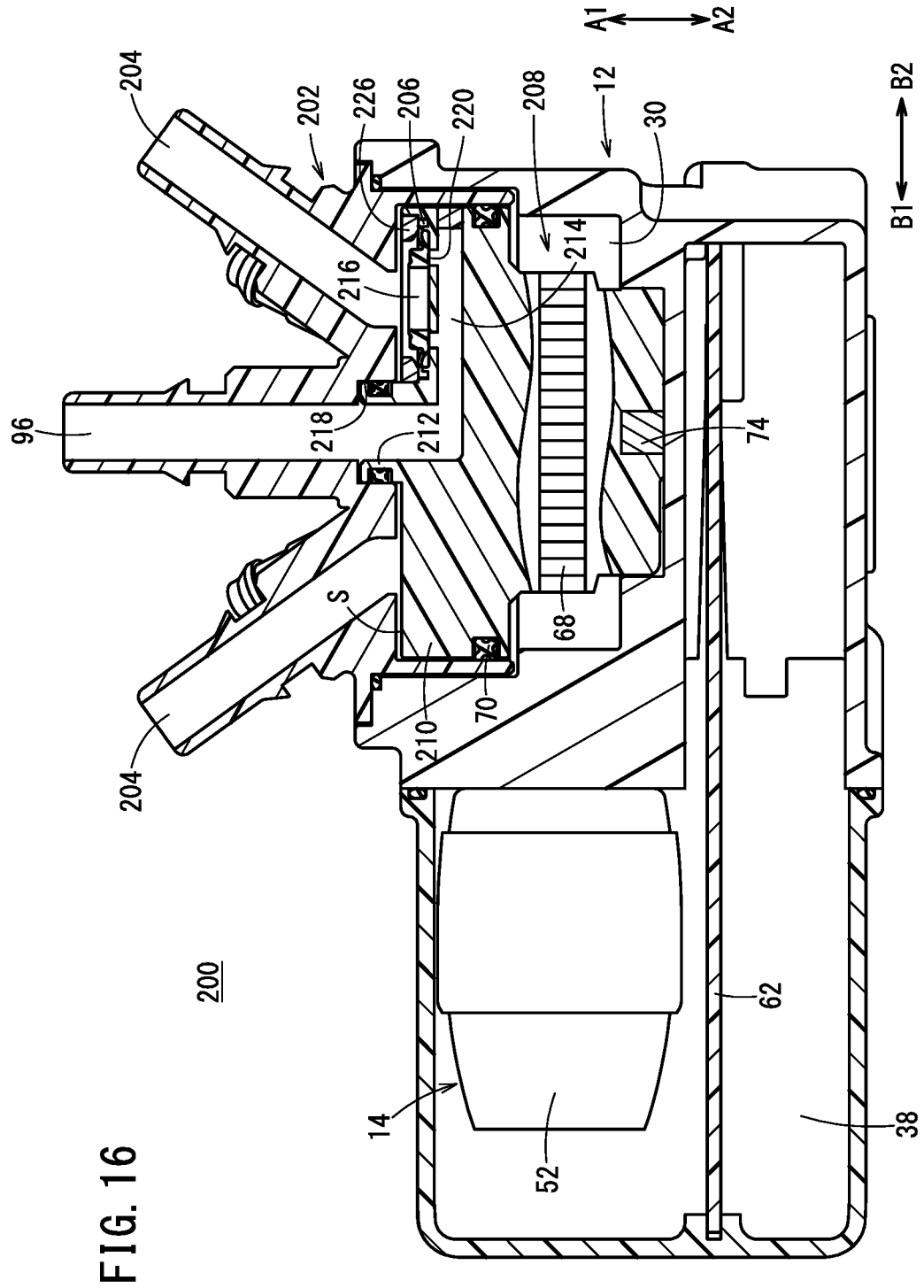
FIG. 16 is a sectional view taken along the line XVI-XVI of FIG. 15.
Figure 17:
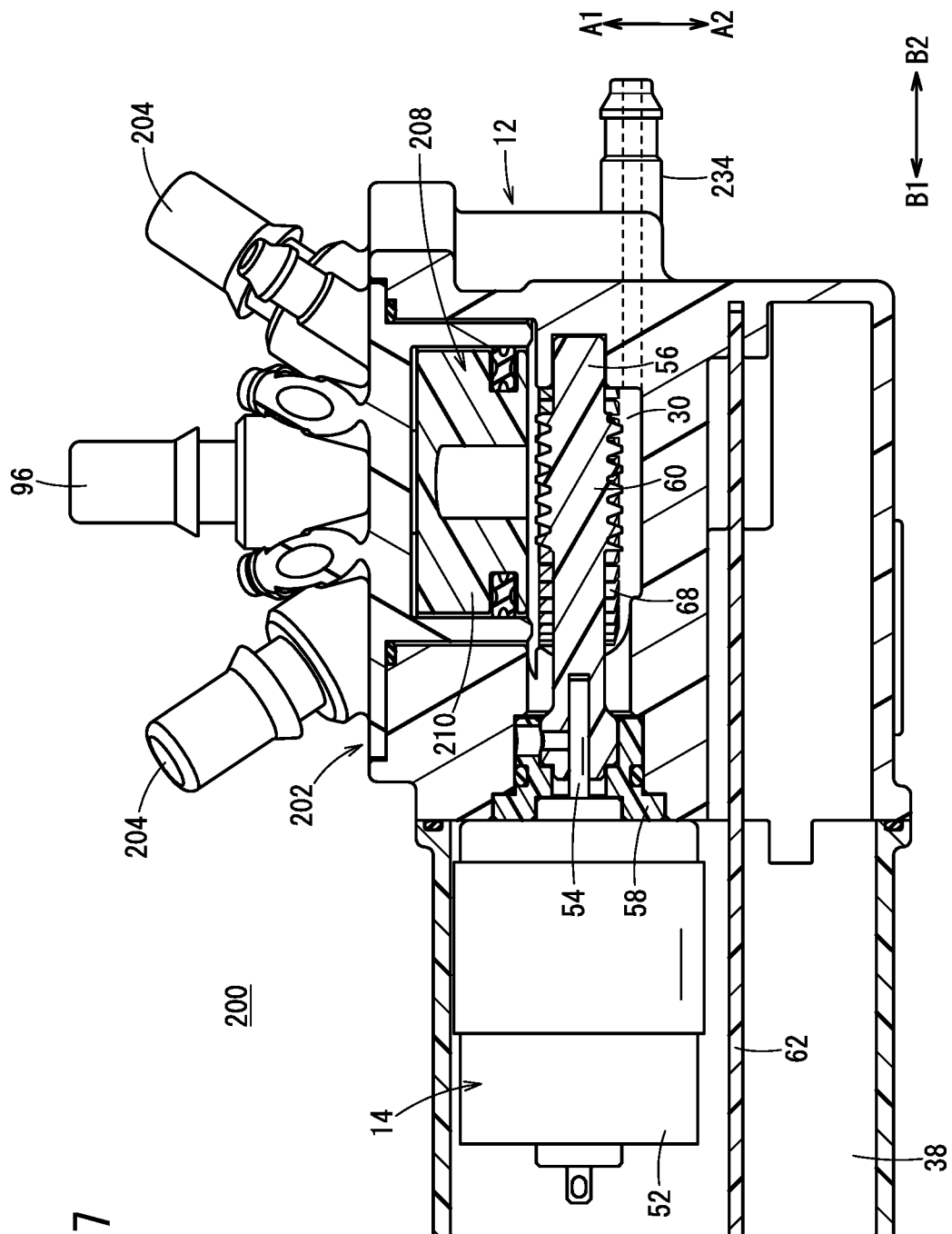
FIG. 17 is a sectional view taken along the line XVII-XVII of FIG. 15.

Each poppet valve 152 is configured with, as depicted in FIGS. 10 and 12, a main body section 188 that is housed in the first valve hole 180, a diaphragm section 190 whose diameter is increased radially outward with respect to the main body section 188 to close an end of the second valve hole 182, and a pin section 192 that extends from the center of the diaphragm section 190 in an axial direction (the arrow A1 direction) and is inserted into the second valve hole 182. At an end of the pin section 192, a valve section 194 formed of an elastic material is provided.

Moreover, in the poppet valve 152, the main body section 188 and the pin section 192 are formed in a linear arrangement and the outer edge of the diaphragm section 190 is sandwiched and held between the first holder plate 166 and the second holder plate 168 (see FIG. 12).

When the poppet valve 152 is biased by a spring 196, which is interposed between an end of the main body section 188 and an end of the first valve hole 180, toward the side where the first holder plate 166 is located (the arrow A2 direction), and the valve section 194 thereof is seated on a valve seat 198 formed at an end of the second valve hole 182, the poppet valve 152 enters a valve-closed state in which communication between the second valve hole 182 and the communicating chamber 184 is interrupted.

Moreover, the end of the main body section 188 protrudes downward (the arrow A2 direction) from the first valve hole 180 by a predetermined length. As depicted in FIG. 12, when the projection 160 is located in a position in which the projection 160 faces the poppet valve 152 by the action of the rotation of the rotor 156, the poppet valve 152 is pressed upward (the arrow A1 direction) and the valve section 194 is separated from the valve seat 198, the poppet valve 152 enters a valve-opened state in which the communicating chamber 184 and the second valve hole 182 communicate with each other.

Next, an operation of the above-described switching valve 150 according to the second embodiment will be described.

First, when the rotary drive source 52 rotates based on a control signal from the unillustrated controller and the rotor 156 is stopped in a state in which the rotor 156 has rotated a predetermined angle in the body 162, the projection 160 faces one of the plurality of poppet valves 152 and presses the poppet valve 152 upward (the arrow A1 direction) against the resilient force of the spring 196, as depicted in FIGS. 10 and 12.

Thus, the poppet valve 152 enters a valve-opened state in which the communicating chamber 184 and the second valve hole 182 communicate with each other as a result of the main body section 188 and the pin section 192 moving upward and the valve section 194 being separated from the valve seat 198. At this time, the remaining poppet valves 152 are in a valve-closed state in which the communicating state with the communicating chamber 184 is interrupted because the valve sections 194 make contact with the valve seats 198 of the second valve holes 182 and close the second valve holes 182 by the action of resilience of the springs 196.

When the poppet valve 152 moves in this manner, one lead-out port 98 and the introduction port 96 communicate with each other via the communicating chamber 184, the second valve hole 182, and the communicating hole 186. Then, the washer fluid is supplied from the unillustrated tank via the introduction tube to the introduction port 96 in a pressurized state, and the washer fluid is supplied to a desired washer nozzle from the lead-out port 98 through the communicating chamber 184, the opened second valve hole 182, and the communicating hole 186.

Moreover, the washer fluid that has entered the housing section 164 in the body 162 is discharged to the outside through a drain port 199 communicating with the bottom of the housing section 164.

As described above, in the second embodiment, by providing, in the table section 158 of the rotor 156 constituting the switching valve 150, the guide balls 174 that make contact with the bottom face of the first holder plate 166, the rotor 156 does not slide on the first holder plate 166 while being in contact completely with the first holder plate 166 when the rotor 156 rotates. Therefore, it is not necessary to apply a lubricant such as grease to contact surfaces of the rotor 156 and the first holder plate 166 as in a conventional switching valve.

Moreover, when the rotor 156 is rotated, since sliding resistance to the first holder plate 166 is small, the rotor 156 can be driven without the need for a large driving force, which makes it possible to make the rotary drive source 52 smaller and accordingly achieve miniaturization of the switching valve 150.

Furthermore, by reducing the sliding resistance of the rotor 156 to the first holder plate 166, it is possible to prevent the occurrence of an unusual sound or wear at the time of rotation of the rotor 156. This makes it possible to enhance the durability of the rotor 156 and the first holder plate 166 and accordingly achieve enhancement of the durability of the switching valve 150.

In addition, since the plurality of poppet valves 152 are biased so that the valve sections 194 are seated on the valve seats 198 by the action of resilience of the springs 196, leakage of the liquid from the second valve holes 182 which are not the second valve hole 182 communicating with the lead-out port 98 through which the liquid is led out, is reliably prevented.

Next, a switching valve 200 according to a third embodiment is depicted in FIGS. 13 to 18B. The same component elements as those of the above-described switching valves 10 and 150 according to the first and second embodiments will be identified with the same reference characters and the detailed explanations thereof will be omitted.

This switching valve 200 according to the third embodiment differs from the switching valves 10 and 150 according to the first and second embodiments in that, in a covering member (a body) 202, a plurality of lead-out ports 204 are provided so as to be inclined in a direction in which the lead-out ports 204 extend away from the introduction port 96 and that a ring-shaped valve body 206 for switching the flowing state of washer fluid to the lead-out ports 204 is provided.

As depicted in FIGS. 13 to 18B, this switching valve 200 includes, in the upper surface of a table section 210 in a rotor (a rotating body) 208, a tube section 212 that is formed in the central part and protrudes upward (an arrow A1 direction), a communicating path 214 that is formed in the center of the tube section 212 and, after extending in an axial direction, extends radially outward, and a valve body housing section 216 formed so as to face an end of the communicating path 214 on the radially outer side.

An O-ring is attached on the outer circumferential surface of this tube section 212 via a ring-shaped groove, and the tube section 212 is inserted into an insertion section 218 formed in a lower part of the introduction port 96 in the covering member 202. As a result, the rotor 208 and the covering member 202 are positioned so as to be coaxially located and the communicating path 214 formed in the tube section 212 and the introduction port 96 communicate with each other.

The communicating path 214 is formed in the shape of a letter L in cross section, for example. The communicating path 214 has an opening at one end thereof, which is formed in the tube section 212, bends at the right angle toward the other end thereof, and then linearly extends radially outward.

The valve body housing section 216 is formed in the upper surface of the table section 210 as a depression which is circular in cross section (see FIG. 14), for example; in the valve body housing section 216, a pair of communicating ports 220 communicating with the communicating path 214 is formed and the valve body 206 is housed so as to be located above the communicating ports 220. In addition, the valve body housing section 216 is formed in a position in which the valve body housing section 216 faces any one of the plurality of lead-out ports 204 when the rotor 208 rotates. That is, the valve body housing section 216 is formed in a position in which the valve body housing section 216 faces an area on the circumference of a circle on which the lead-out ports 204 are placed. The valve body housing section 216 is formed so as to have a cross-sectional shape corresponding to the cross-sectional shape of the valve body 206 which is housed therein.

The communicating ports 220 are arc-shaped in cross section, for example, pass therethrough in a vertical direction so as to be substantially parallel to the introduction port 96, are formed on the same circumference of a circle, and communicate with an end of the communicating path 214.

The valve body 206 is formed of, for example, an elastic material such as rubber, configured with a valve section 222 formed in the shape of a ring and a skirt section 224 extending radially outward from the valve section 222, and held as a result of the outer edge of the skirt section 224 being inserted into a ring-shaped groove formed in the valve body housing section 216 and pressed by a ring body 226 inserted into the valve body housing section 216. In addition, the valve body 206 is provided so as to be flexible by using the outer edge of the skirt section 224 as a support, and the valve section 222 covers the openings of the communicating ports 220. The valve body 206 may be circular in cross section as described above or may be elliptical in cross section.

Moreover, a space S of a predetermined spacing is provided between the table section 210 of the rotor 208 and the bottom face of the covering member 202.

Next, an operation of the above-described switching valve 200 according to the third embodiment will be described.

Figure 18A:
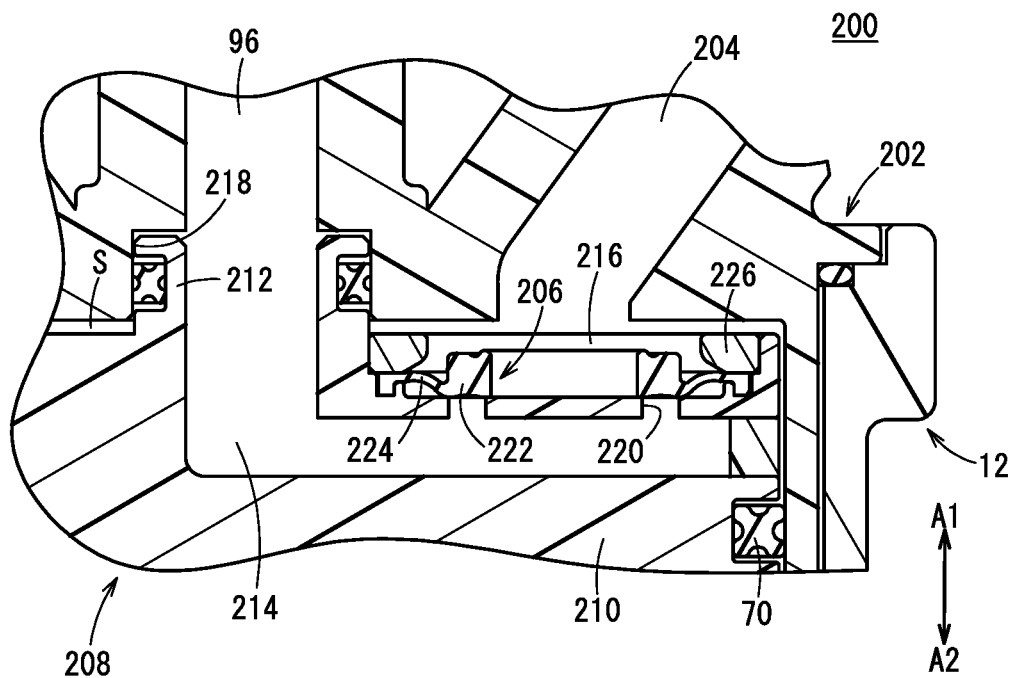
FIG. 18A is an enlarged sectional view depicting an area near a valve body in FIG. 16

First, the rotary drive source 52 rotates based on a control signal from the unillustrated controller, the rotor 208 rotates a predetermined angle in the body 12, and the rotation of the rotor 208 is stopped in a state in which the radially outside end of the communicating path 214 is located in a position in which the radially outside end faces a desired lead-out port 204 and the valve body housing section 216 (see FIG. 18A).

Figure 18B:
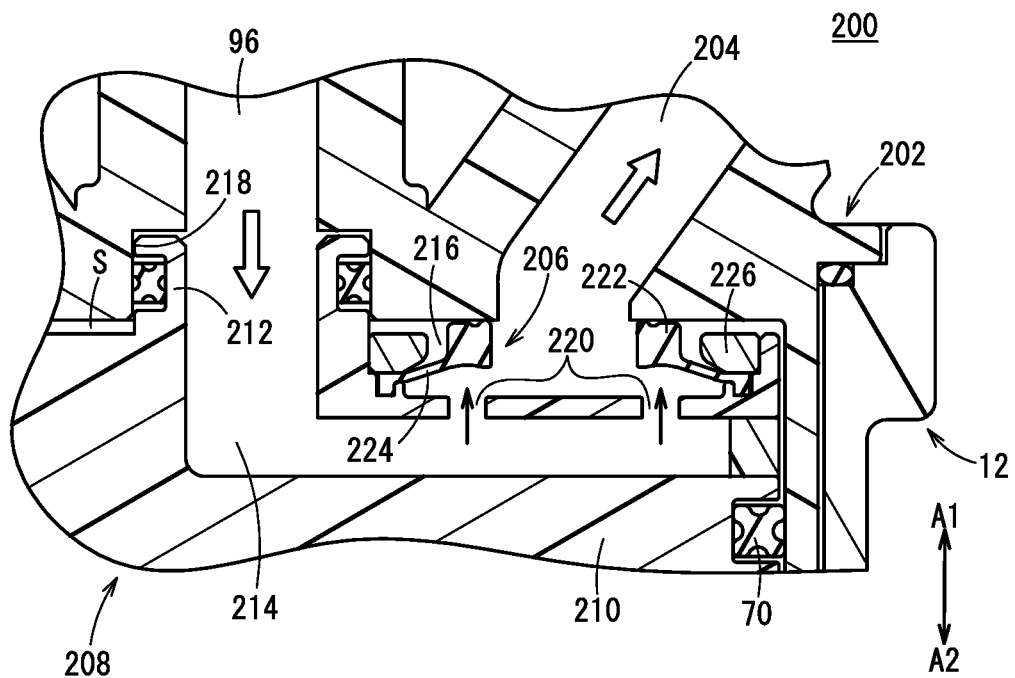
FIG. 18B is an enlarged sectional view depicting a case in which the valve body of FIG. 18A enters a valve-opened state.

Next, from this state depicted in FIG. 18A, the pressurized washer fluid is supplied to the introduction port 96 from the unillustrated tank via the introduction tube, and as depicted in FIG. 18B, flows radially outward through the communicating path 214 in the shape of a letter L in cross section into the pair of communicating ports 220, whereby the valve section 222 of the valve body 206 is pressed upward (the arrow A1 direction) by the fluid pressure.

As a result, the valve section 222 of the valve body 206 moves upward (the arrow A1 direction) via the skirt section 224 and enters a valve-opened state in which the communicating ports 220 are opened, whereby the washer fluid flows into the valve body housing section 216 from the communicating ports 220. Thereafter, the washer fluid is supplied to a desired washer nozzle from the lead-out port 204 through the central part of the valve body 206.

At this time, since an upper part of the valve section 222 of the valve body 206 makes contact with the bottom face of the covering member 202 and is pressed toward the side where the covering member 202 is located (the arrow A1 direction) by the fluid pressure of the washer fluid, a gap between the valve section 222 and the covering member 202 is sealed, which prevents the washer fluid flowing through the communicating path 214 from leaking to the outside. That is, in addition to the valve function that switches the flowing state of the washer fluid, the valve section 222 of the valve body 206 also has the sealing function of preventing leakage of the washer fluid to the outside.

Moreover, the washer fluid that has entered the first rotor housing hole 30 in the body 12 is discharged to the outside through a drain port 234 communicating with the bottom of the first rotor housing hole 30.

As described above, the third embodiment adopts a configuration in which the valve body 206 that opens and closes the pair of communicating ports 220 is provided in the upper surface of the table section 210 constituting the rotor 208, and in which the valve body 206 is opened by being pressed by the fluid pressure of the washer fluid which is supplied through the communicating path 214, and in which the space S is provided between the upper surface of the rotor 208 and the bottom face of the covering member 202. Because of this configuration, the rotor 208 does not slide on the covering member 202 when rotating, which makes it possible to reduce the rotational resistance of the rotor 208 and eliminates the need to apply a lubricant such as grease to the rotor 208 and the covering member 202 as in the conventional switching valve.

As a result, enhancement of durability is achieved by preventing the occurrence of an unusual sound or wear at the time of rotation of the rotor 208 by reducing the sliding resistance of the rotor 208 to the covering member 202. Further, even when the liquid introduced from the introduction port 96 enters the space between the covering member 202 and the upper surface of the rotor 208, the liquid does not come into contact with the lubricant, which prevents contamination of the liquid by the lubricant.

Moreover, when the rotor 208 is rotated, since the sliding resistance thereof to the covering member 202 is small, it is possible to drive the rotor 208 without the need for a large driving force, which makes it possible to make the rotary drive source 52 smaller and accordingly achieve miniaturization of the switching valve 200.

Furthermore, if a foreign material or the like gets mixed in with the liquid, the space S provided between the covering member 202 and the rotor 208 avoids a situation in which the foreign material or the like is sandwiched between the covering member 202 and the rotor 208 and a scratch is made thereby. As a result, it is possible to enhance the durability of the rotor 208 and the covering member 202 and accordingly achieve enhancement of the durability of the switching valve 200.

In addition, when the valve body 206 provided in the rotor 208 is pressed in a state in which the valve body 206 is in contact with the bottom face of the covering member 202 by the fluid pressure by the action of supply of the washer fluid, a gap between the upper surface of the rotor 208 and the bottom face of the covering member 202 is reliably sealed by the valve body 206. Leakage of the liquid is reliably prevented, from the lead-out ports 204 which are not the lead-out port 204 from which the liquid is led out.

Figure 19:
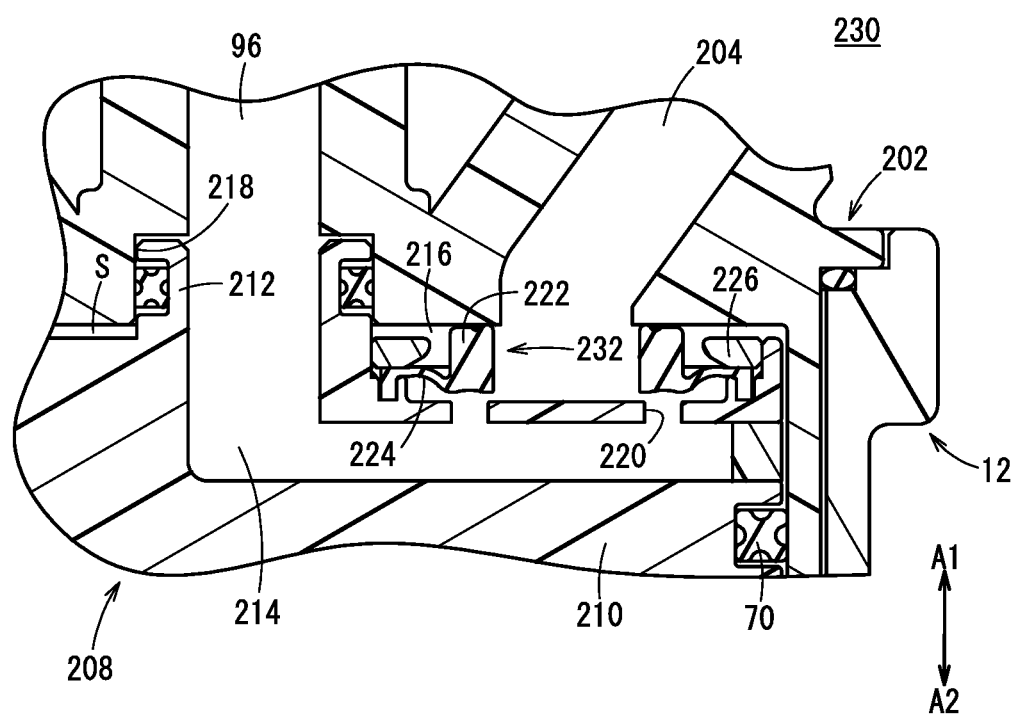
FIG. 19 is an enlarged sectional view of a switching valve in which a valve body according to a modified example is used.

Moreover, the valve body 206 is not limited to a configuration in which the valve body 206 is placed on the side where the rotor 208 is located (an arrow A2 direction) as described above so as to close the pair of communicating ports 220 in a state in which the washer fluid is not supplied; for example, like a valve body 232 of a switching valve 230 which is depicted in FIG. 19, the valve body 232 may be configured so as to be placed on the side where the covering member 202 is located (the arrow A1 direction) even in a state in which the washer fluid is not supplied.

In this configuration, as compared to the above-described switching valve 200 according to the third embodiment, since the valve body 232 is placed in advance so as to be close to the covering member 202, even when, for example, the fluid pressure of the washer fluid which is supplied to the inside of the valve body housing section 216 from the communicating path 214 is low, it is possible to perform sealing by moving the valve body 232 easily and reliably toward the side where the covering member 202 is located (the arrow A1 direction) and pressing the valve body 232 toward the side where the covering member 202 is located (the arrow A1 direction).

That is, even when the pressing force from the washer fluid is low, it is possible to perform sealing reliably by the valve body 232.

Moreover, since a space in which some substance can freely move is provided below the valve section 222 in the valve body 232, even when a foreign material or the like gets mixed in with the washer fluid, the foreign material or the like can move downward, whereby a situation in which the foreign material or the like is sandwiched between the valve section 222 and the covering member 202 and a scratch is made thereby on the valve section 222 or the like, is avoided.

It goes without saying that the switching valve according to the present invention is not limited to the above-described embodiments, and various configurations can be adopted without departing from the gist of the present invention.

The invention claimed is:

1. A switching valve that includes a body including an introduction port into which liquid is introduced and a plurality of lead-out ports from which the liquid is led out, and a rotating body rotatably provided in the body, wherein as a result of the rotating body being rotated, any one of the plurality of lead-out ports and the introduction port communicate with each other via a communicating path formed at an end of the rotating body, and a supply state of the liquid to the lead-out ports is switched, wherein the end of the rotating body is provided so as to face an inner wall surface of the body in which the introduction port and the lead-out ports are formed, a valve body is provided at the end, the valve body configured to close another lead-out port other than the lead-out port that leads the liquid out, wherein the valve body enters a valve-opened state by being pressed by a supply action of the liquid, and makes contact with an inner wall surface of the body, and a space in an axial direction of the rotating body is provided between the end and the inner wall surface.

2. The switching valve according to claim 1, wherein the rotating body is rotatably supported with respect to a housing hole in which the rotating body is housed, and a sealing member is provided on an outer circumferential surface of the rotating body facing the housing hole.

3. The switching valve according to claim 1, wherein the valve body is a diaphragm valve that has flexibility, and an outer edge of the diaphragm valve is held.

4. The switching valve according to claim 1, wherein the valve body is configured to close a communicating port that communicates with the communicating path.

5. The switching valve according to claim 1, wherein the lead-out ports are provided so as to be separated from one another at a regular interval in a circumferential direction of the body, and the introduction port is provided in a center of the body and the lead-out ports.

6. The switching valve according to claim 2, wherein a drain port is provided in the body, and is configured to make a bottom of the housing hole and an outside communicate with each other.

* * * * *